United States Patent
Raman et al.

(10) Patent No.: US 9,025,656 B1
(45) Date of Patent: May 5, 2015

(54) FLOATING-TAP DECISION FEEDBACK EQUALIZER

(71) Applicant: Altera Corporation, San Jose, CA (US)

(72) Inventors: Sangeeta Raman, San Jose, CA (US); Tim Tri Hoang, San Jose, CA (US); Wilson Wong, San Francisco, CA (US); Jie Shen, Fremont, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/106,389

(22) Filed: Dec. 13, 2013

(51) Int. Cl.
*H03H 7/30* (2006.01)
*H03H 7/40* (2006.01)
*H03K 5/159* (2006.01)
*H04L 25/03* (2006.01)

(52) U.S. Cl.
CPC ..... *H04L 25/03949* (2013.01); *H04L 25/03019* (2013.01)

(58) Field of Classification Search
CPC ............. H04L 25/03038; H04L 25/03019; H04L 25/03949

USPC ......... 375/229–230, 232–233, 235, 285, 350; 708/300, 323

See application file for complete search history.

(56) References Cited

U.S. PATENT DOCUMENTS

| | | |
|---|---|---|
| 2009/0016422 A1 | 1/2009 | Zhong et al. |
| 2011/0142120 A1 | 6/2011 | Liu et al. |
| 2013/0039407 A1 | 2/2013 | Aziz et al. |
| 2013/0128946 A1 | 5/2013 | Gardner et al. |
| 2013/0230092 A1* | 9/2013 | Prokop et al. .......... 375/233 |
| 2013/0230093 A1 | 9/2013 | Aziz et al. |

* cited by examiner

*Primary Examiner* — Jean B Corrielus
(74) *Attorney, Agent, or Firm* — Okamoto & Benedicto LLP

(57) ABSTRACT

The present disclosure provides a floating-tap decision feedback equalization (DFE) circuit. In an exemplary implementation, the floating-tap DFE circuit may include a high-speed shift register, a deserializer and data selector, a bypass deserializer, a high-speed multiplexer and a tap generation circuit. In one aspect of the invention, the floating-tap DFE circuit may advantageously cover an entire tap range beyond a fixed tap range without holes over a range of data rates. Other embodiments, aspects and features are also disclosed.

16 Claims, 18 Drawing Sheets

Tap Generation 1000

FLOATING-TAP DECISION FEEDBACK EQUALIZER

BACKGROUND

1. Technical Field

The present invention relates generally to data communications. More particularly, the present invention relates to circuitry for high-speed data links.

2. Description of the Background Art

High-speed data links are used to communicate data between devices in a system. Serial interface protocols have been developed at increasingly fast data rates for such high-speed data links.

SUMMARY

The present disclosure provides a floating-tap decision feedback equalization (DFE) circuit. In an exemplary implementation, the floating-tap DFE circuit may include a high-speed shift register, a deserializer and data selector, a bypass deserializer, a high-speed multiplexer and a tap generation circuit. In one aspect of the invention, the floating-tap DFE circuit may advantageously cover an entire tap range (i.e. without holes) beyond a fixed tap range over a range of data rates. Other embodiments, aspects and features are also disclosed.

DETAILED DESCRIPTION

The present disclosure provides innovative apparatus and methods for floating-tap decision feedback equalization. These apparatus and methods are described in detail as follows.

Note that the exemplary implementation described below may achieve complete coverage (i.e. without holes) of all taps beyond the fixed taps up to a maximum tap. The maximum tap may be at the 64 unit interval (UI), for example.

Note also that, in accordance with the exemplary implementation, the position of the floating taps may be selectable either manually by a programmable setting, or in an automated manner using an adaptation engine.

In addition, the exemplary implementation described below may operate effectively at a wide range of data rates. For example, applicants have determined that the exemplary implementation may run at data rates from 3 Gbps to 32 Gbps.

As detailed below, the exemplary implementation includes a 48-bit deserializer path formed using a deserializer 600 and data selector 700. Applicants have determined that this deserializer path has latency because the clock frequency changes in that path. As a result, certain tap positions are not covered by the floating taps (i.e. there are holes in the tap range) using this deserializer path. Hence, the exemplary implementation below incorporates a bypass path which goes through the bypass deserializer 800. The output of this bypass path may be advantageously used to fill the holes in the tap range created by the latency in the deserializer path.

Figure 1:
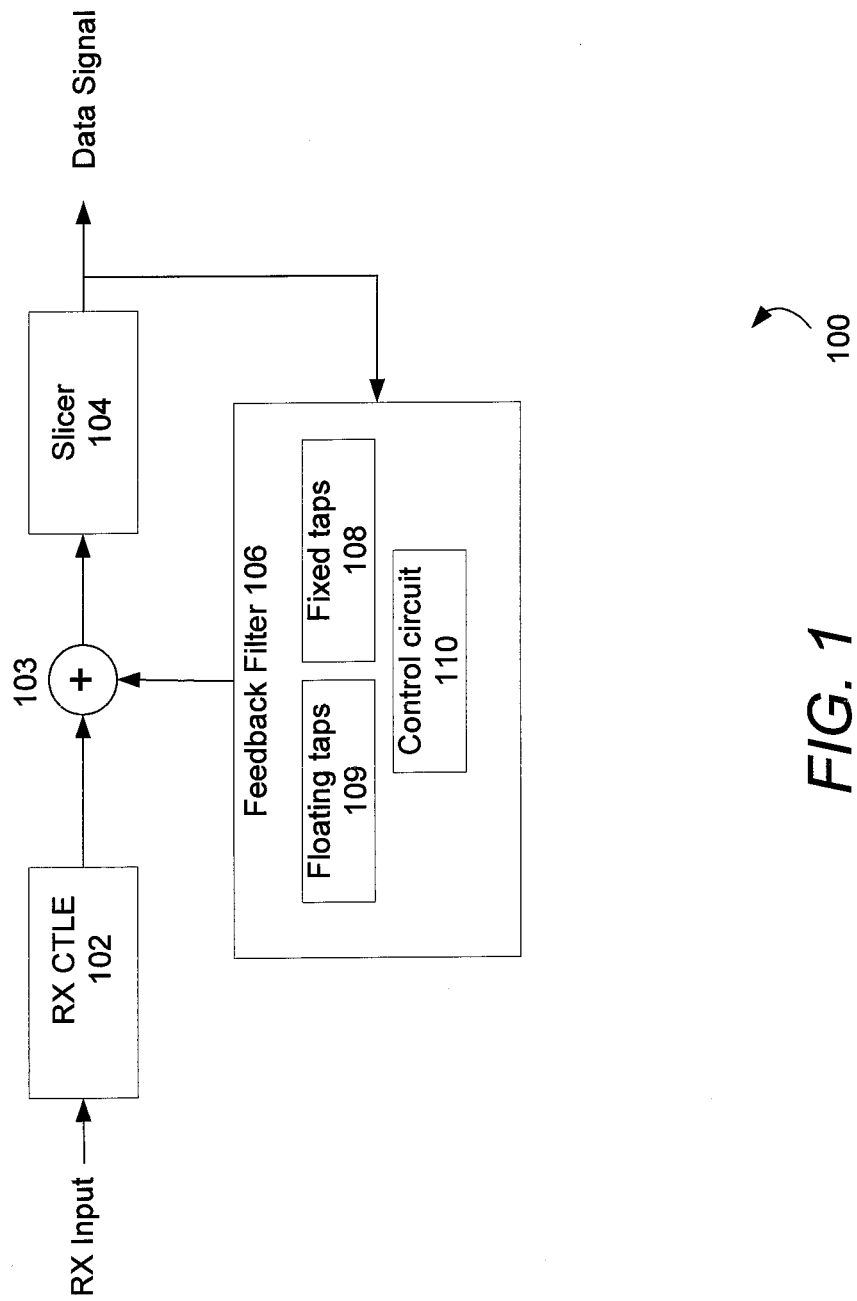
FIG. 1 depicts a receiver circuit for a high-speed serial data link in accordance with an embodiment of the invention.

FIG. 1 depicts a receiver circuit 100 for a high-speed serial data link in accordance with an embodiment of the invention. The receiver 100 includes a receiver continuous-time linear equalization (RX CTLE) circuit 102, a slicer (decision) circuit 104, and a feedback filter circuit 106. As shown, the feedback filter circuit 106 may include fixed taps 108, floating taps 109, and a control circuit 110. In accordance with an embodiment of the invention, the control circuit 110 may control the generation of the floating taps 108 for the feedback filter 106.

A received data signal (RX Input) is input to the RX CTLE 102. The output of the feedback filter 106 is added to the output of the RX CTLE 102, and the resultant signal is provided to the data slicer 104. The slicer 104 quantizes the signal and outputs a data signal. The data signal is fed back to the feedback filter 106 for the decision feedback equalization.

Figure 2:
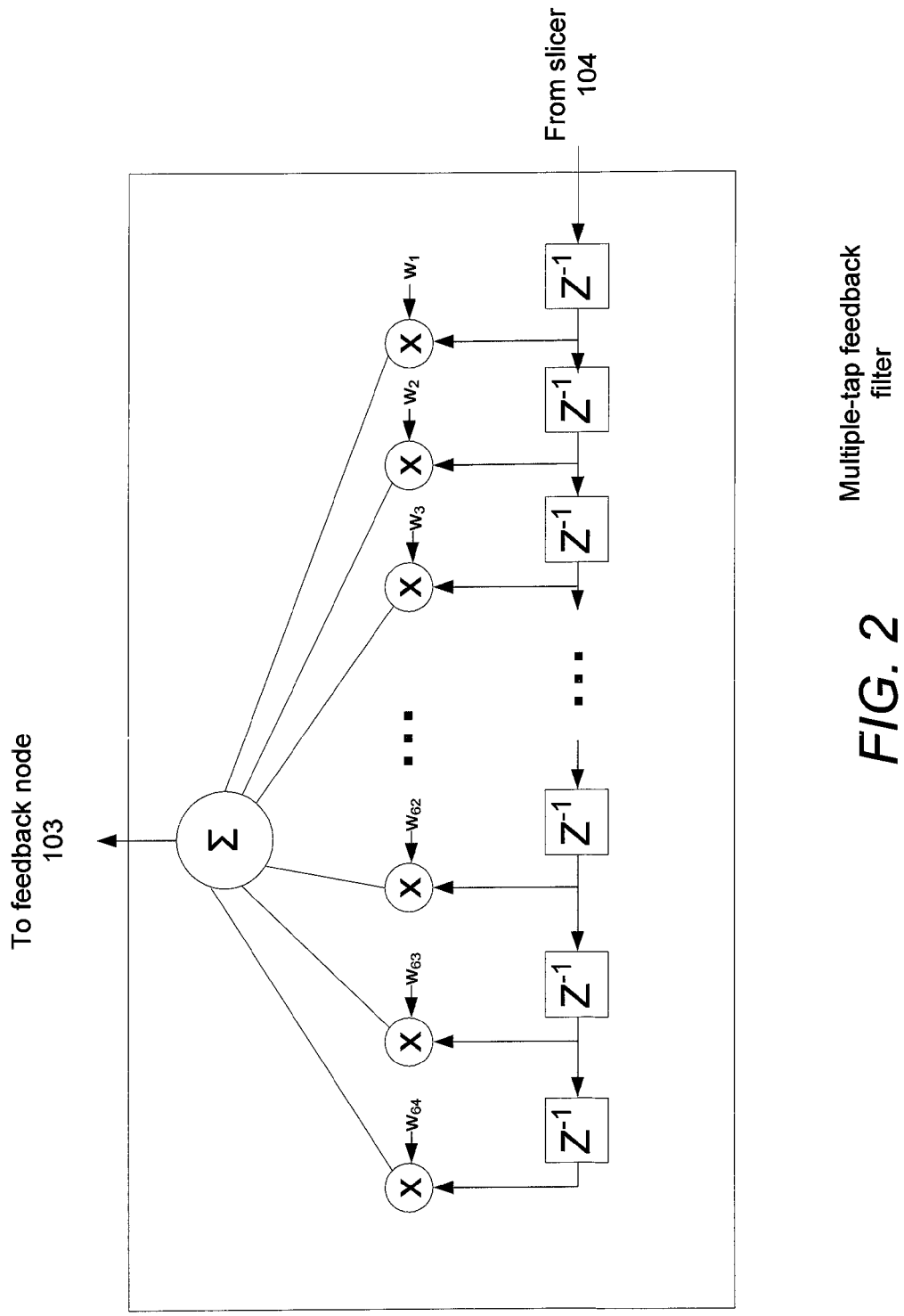
FIG. 2 is a diagram of a multiple-tap feedback filter in accordance with an embodiment of the invention.

FIG. 2 is a diagram of a multiple-tap feedback filter in accordance with an embodiment of the invention. As illustrated, the data signal fed back from the slicer 104 may be input into a 64-stage tapped delay line of an exemplary filter structure. Each $Z^{-1}$ delay is a unit delay. In this example, there are 64 tap weights $w_1$ through $w_{64}$, and the combined signal from the $\Sigma$ node is output to the sum node 103.

Figure 3:
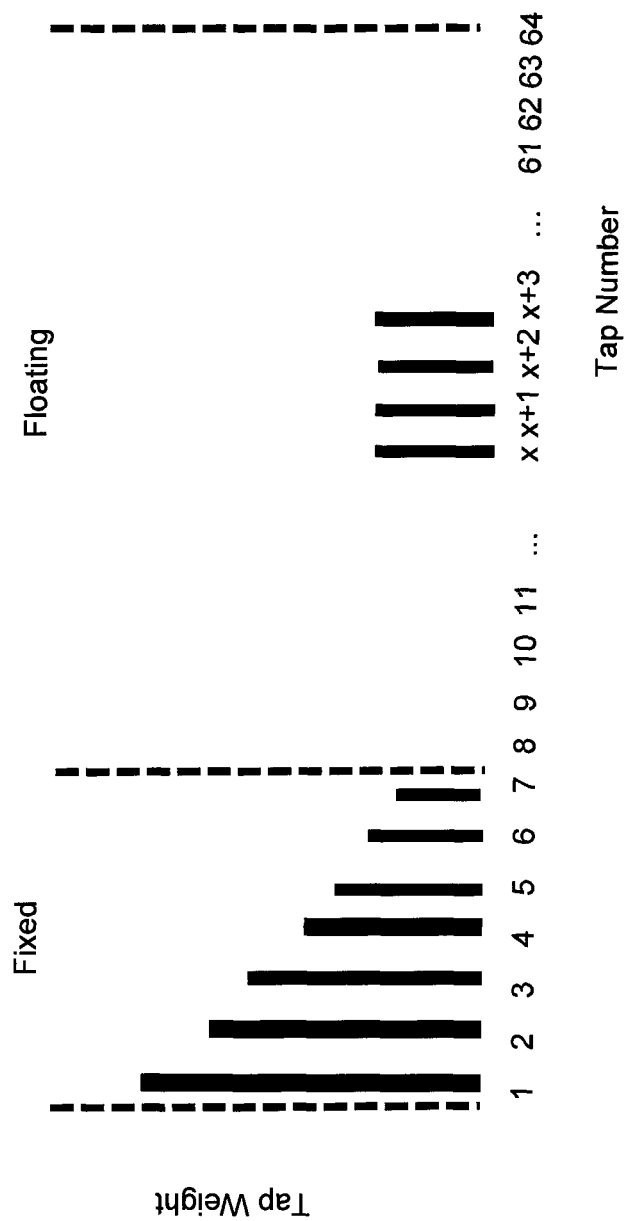
FIG. 3 is a diagram of fixed and floating taps for a feedback filter in accordance with an embodiment of the invention.

FIG. 3 is a diagram of fixed and floating taps for a feedback filter in accordance with an embodiment of the invention. In an exemplary implementation, the feedback filter may have the first several taps being fixed taps and a consecutive group of floating taps whose position may vary depending on a floating tap position setting.

In the illustrated example, there are seven fixed taps at taps 1 through 7 and four floating taps which are denoted as taps x; x+1; x+2; and x+3, where x ranges from 8 to 61. The group of floating taps may move together as the floating tap position setting is varied (i.e. as x is varied). Hence, the four floating taps may be located at taps 8 through 11 (i.e. x=8), or taps 9 through 12 (i.e. x=9), or taps 10 through 13 (i.e. x=9), ..., or taps 61 through 64 (i.e. x=61).

In an exemplary implementation, a floating tap sweep controlled by the control circuit 110 may start with the floating taps at taps 8 through 11 (i.e. x=8) and be incremented one tap number at a time (i.e. x may be incremented by one each time) such that the sweep ends with the floating taps at taps 61 through 64. At each different position setting, a performance measure may be determined to gauge the effectiveness of the DFE. Based on the performance measure, a particular position setting may be selected for operation of the DFE.

Figure 4:
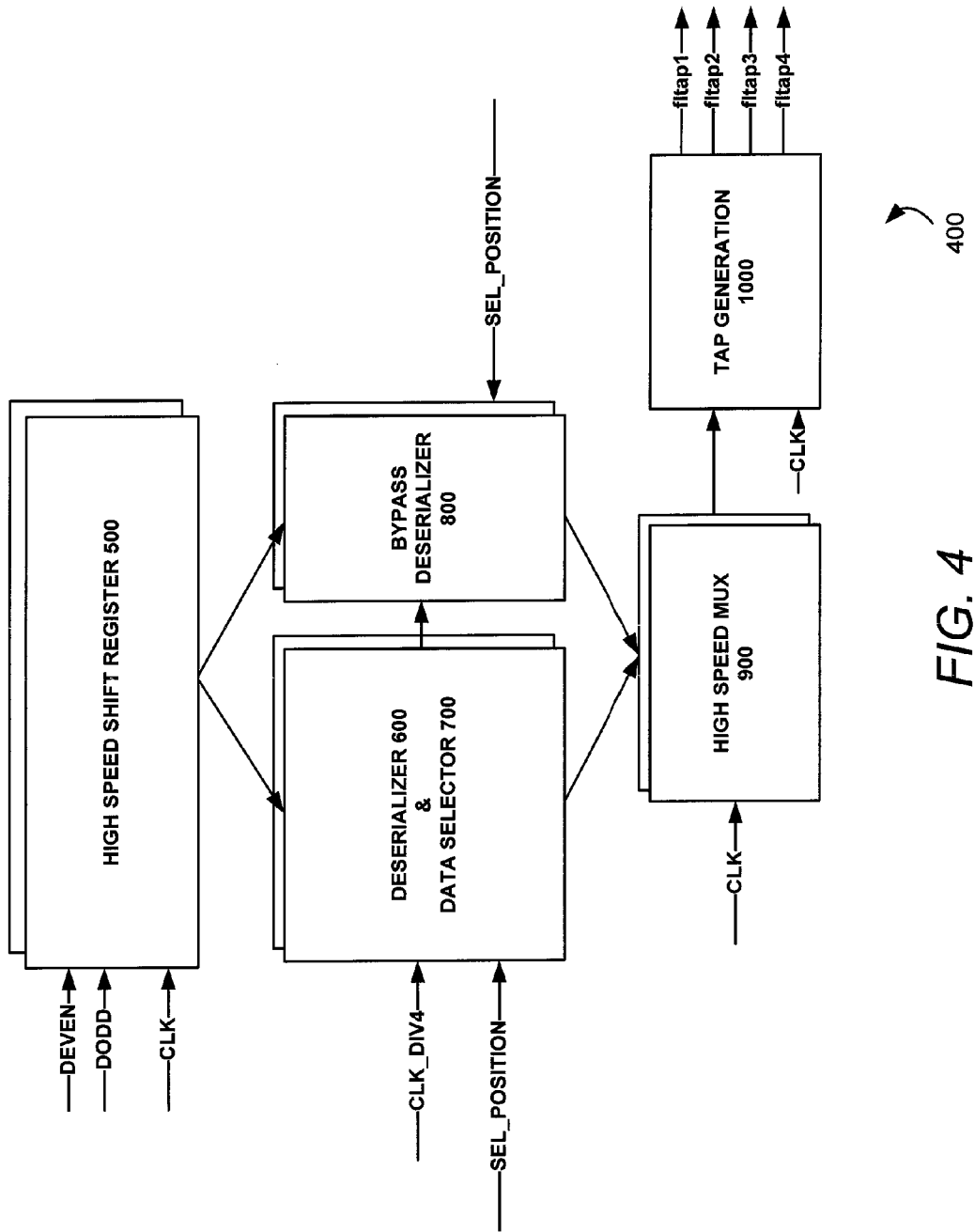
FIG. 4 depicts an exemplary implementation of a floating-tap generation circuit in accordance with an embodiment of the invention.

FIG. 4 depicts an exemplary implementation of a floating-tap generation circuit in accordance with an embodiment of the invention. As shown, the floating-tap generation circuit may include a high-speed shift register 500, a deserializer 600, a data selector 700, a bypass deserializer 800, a high-speed multiplexer (MUX) 900 and a tap generation circuit 1000. In this exemplary implementation, the shift register 500, deserializer 600, data selector 700, bypass deserializer 800, and high-speed MUX 900 may each include an even half for processing even data and an odd half for processing odd data.

As further shown in FIG. 4, the shift register 500 may receive even and odd bit streams (DEVEN and DODD, respectively) from a serial data signal and a first clock signal (CLK). The shift register 500 generates parallel outputs of the even and odd data that are provided to the deserializer 600 and the bypass deserializer 800. A second clock signal (CLK_DIV4) may be provided to the deserializer 600 and the data selector 700 and also to the bypass deserializer 800. The second clock signal may be generated by dividing the first clock signal by a number equal to the number of floating taps (which is four, in this example). In addition, a position selection (SEL_POSITION) signal may be provided to the data selector 700 and bypass deserializer 800.

The SEL_POSITION signal may be a multiple-bit signal that indicates a position of a lowest tap of the group of floating taps. In one implementation, the SEL_POSITION signal may be a six-bit binary signal (i.e., SEL_POSITION <5:0>) ranging from 001000 which indicates tap number eight to 111101 which indicates tap number sixty-one (32+16+8+4+1=61). The lowest-order bit of the position signal (i.e. SEL_POSITION <0>) indicates whether the position is even (0) or odd (1).

As further shown in FIG. 4, the data selector 700 and the bypass deserializer 800 provide output signals to the high-speed MUX 900. As described further below, the data selector 700 outputs even and odd multiple-bit signals to the high-speed MUX 900, and the bypass deserializer 800 outputs even and odd bypass bit signals to the high-speed MUX 900. The high-speed MUX 900 uses the first clock signal (CLK) to serialize the even and odd multiple-bit signals from the data selector 700 to generate even and odd primary bit signals. The output of the high-speed MUX 900 selected to be either even and odd primary bit signals or the even and odd bypass bit signals.

The tap generation circuit 1000 receives the output of the MUX 900 and also the first clock signal. The first clock signal is used to generate a group of floating taps (for example, fltap1, fltap2, fltap3, and fltap4) from the output of the MUX 900. Subsequently, the floating taps may be weighted and provided to a summation node prior to output by the feedback filter, as described above in relation to FIG. 2.

Figure 5A:
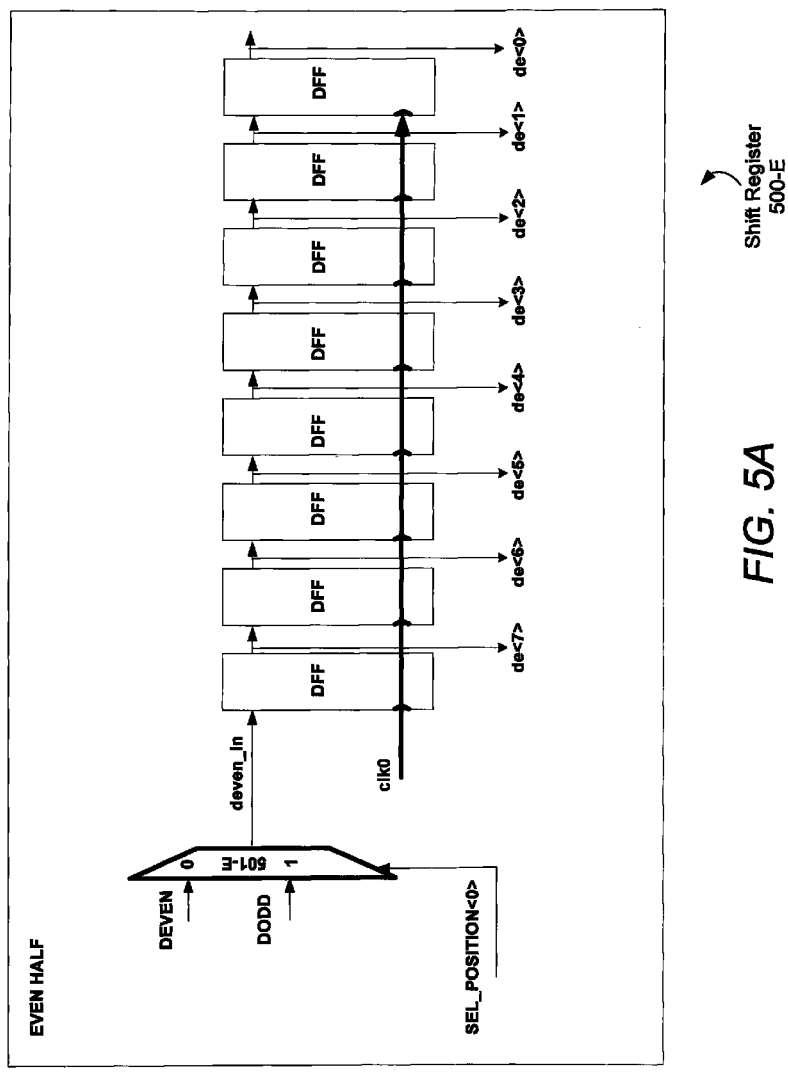
FIGS. 5A and 5B depict, respectively, exemplary implementations of even and odd high-speed shift registers for a floating-tap generation circuit in accordance with an embodiment of the invention.
Figure 5B:
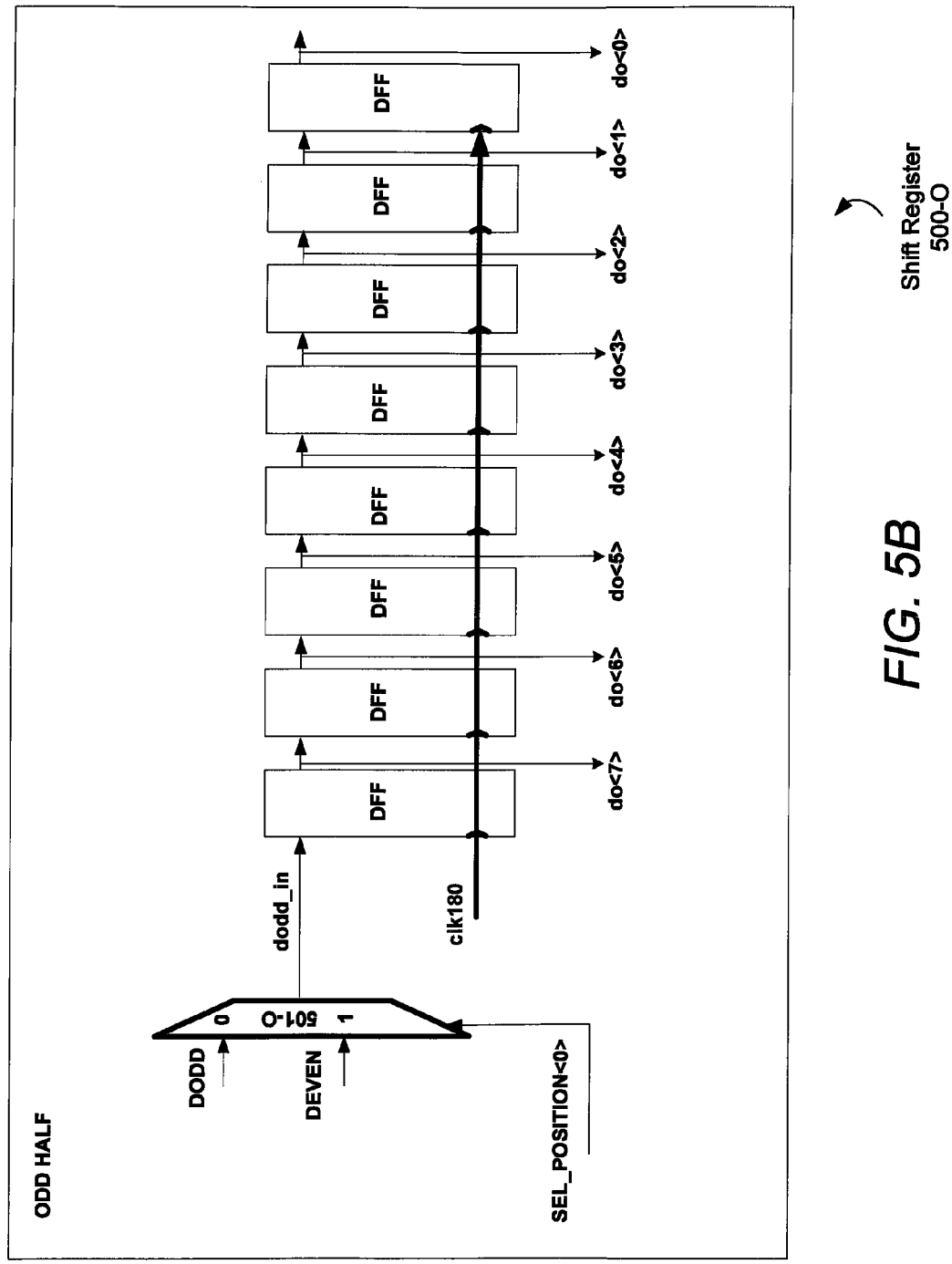

FIGS. 5A and 5B depict, respectively, exemplary implementations of even and odd high-speed shift registers for a floating-tap generation circuit in accordance with an embodiment of the invention. Together, the even shift register (500-E) in FIG. 5A and the odd shift register (500-O) in FIG. 5B form the shift register 500 in FIG. 4.

As depicted in FIG. 5A, a selector circuit 501-E is controlled by a control signal SEL_POSITION<0> to select the even bit stream (DEVEN) if SEL_POSITION<0> is 0 (low), or the odd bit stream (DODD) if SEL_POSITION<0> is 1 (high). The control signal SEL_POSITION<0> corresponds to a lowest bit of the SEL_POSITION signal.

The output of the selector circuit 501-E is an even data input signal (deven_in) that is provided to the data input of a first D flip-flop (DFF) circuit of a series of DFF circuits. The first clock signal CLK shifted by 0 degrees clk0 (i.e. the even version of CLK) is provided to the clock inputs for the DFF circuits in the series.

Each DFF circuit in the series provides its data output to a next DFF circuit in the series until the end of the series. In the implementation shown, there are eight DFF circuits that output the even data signals denoted de<7>, de<6>, de<5>, de<4>, de<3>, de<2>, de<1>, and de<0>. These even data signals are output in parallel from the shift register 500-E as an even parallel data signal de<7:0>.

Similarly, as depicted in FIG. 5B, a selector circuit 501-O is controlled by the control signal SEL_POSITION<0> to select the odd bit stream (DODD) if SEL_POSITION<0> is 0 (low), or the even bit stream (DEVEN) if SEL_POSITION<0> is 1 (high). Hence, if SEL_POSITION<0> is 0, then selector 501-E selects DEVEN and selector 501-O selects DODD. On the other hand, if SEL_POSITION<0> is 1, then selector 501-E selects DODD and selector 501-O selects DEVEN.

The output of the selector circuit 501-O is an odd data input signal (dodd_in) that is provided to the data input of a first D flip-flop (DFF) circuit of a series of DFF circuits. The first clock signal CLK shifted by 180 degrees clk180 (i.e. the odd version of CLK) is provided to the clock inputs for the DFF circuits in the series.

Each DFF circuit in the series provides its data output to a next DFF circuit in the series until the end of the series. In the implementation shown, there are eight DFF circuits that output the odd data signals denoted do<7>, do<6>, do<5>, do<4>, do<3>, do<2>, do<1>, and do<0>. These odd data signals are output in parallel from the shift register 500-O as an odd parallel data signal do<7:0>.

Figure 6A:
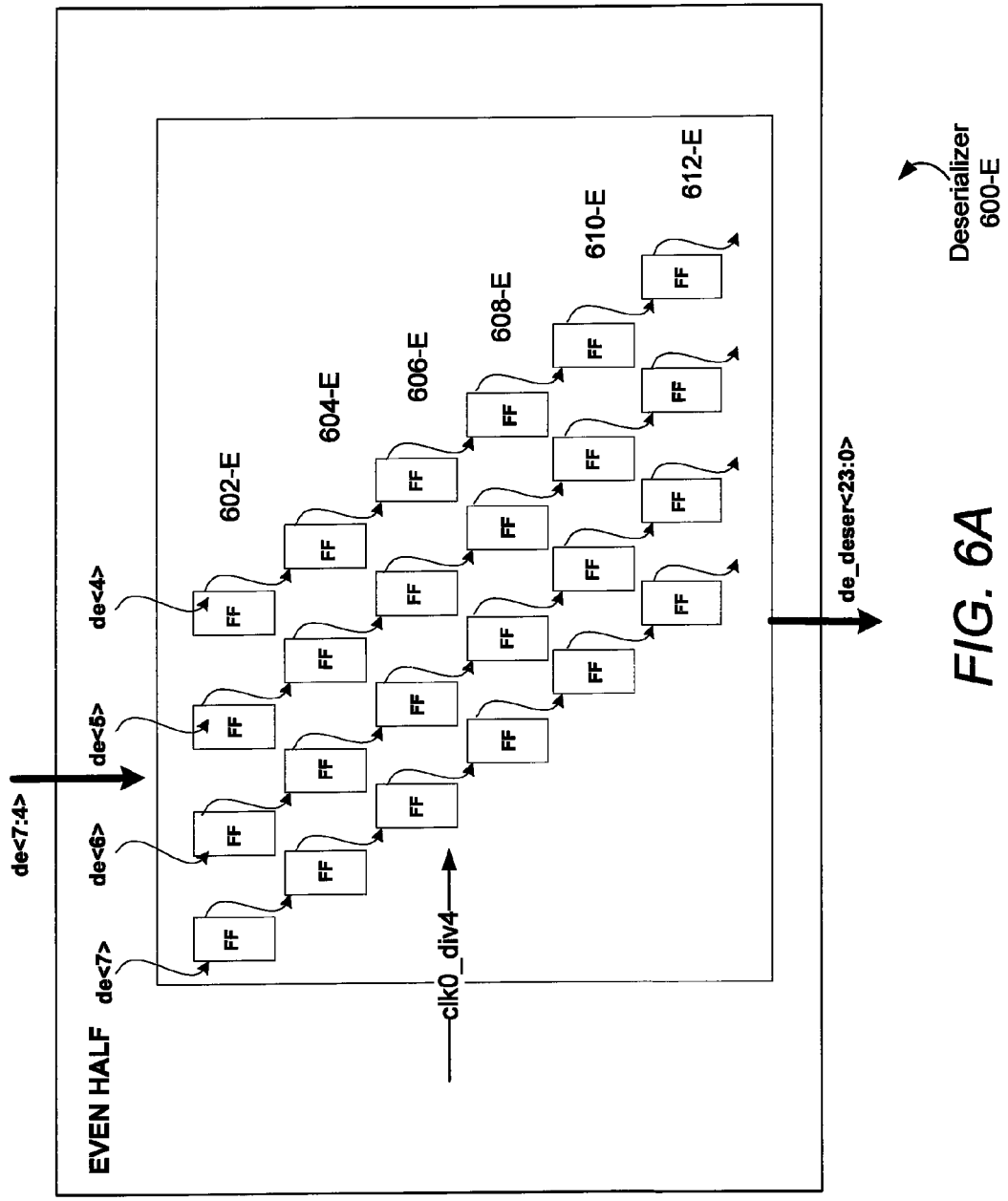
FIGS. 6A and 6B depict, respectively, exemplary implementations of even and odd deserializers for a floating-tap generation circuit in accordance with an embodiment of the invention.
Figure 6B:
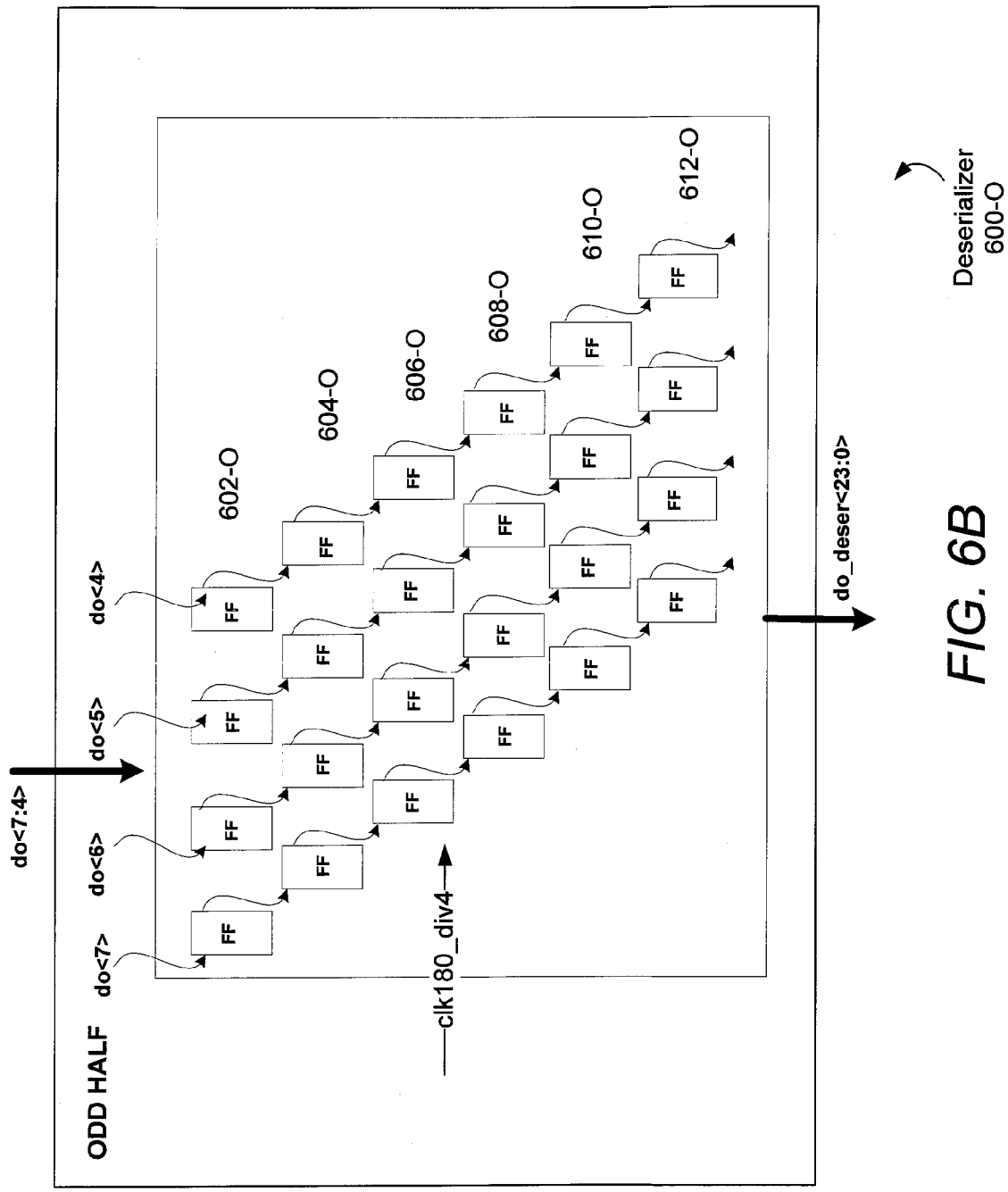

FIGS. 6A and 6B depict, respectively, exemplary implementations of the even and odd deserializers for a floating-tap generation circuit in accordance with an embodiment of the invention. Together, the even deserializer (600-E) in FIG. 6A and the odd deserializer (600-O) in FIG. 6B form the deserializer 600 in FIG. 4.

In the implementation depicted in FIG. 6A, the even deserializer 600-E includes six rows of four flip-flop (FF) circuits (602-E, 604-E, 606-E, 608-E, 610-E, and 612-E). The upper four bits of the even data signals, denoted de<7>, de<6>, de<5>, and de<4>, may be provided to the data inputs of a first row 602-E of flip-flop (FF) circuits. The second clock signal CLK_DIV4 shifted by 0 degrees (i.e. clk0_div4 which is the even version of CLK_DIV4) may be provided to the clock inputs of the FF circuits.

As triggered by clk0_div4, the FF circuits in each row shifts its data to corresponding FF circuits in the row below. As depicted, the FF circuits in the first row 602-E shifts its data to the corresponding FF circuit in the second row 604-E. At the same time, the FF circuits in the second row 604-E shift their data to the corresponding FF circuits in the third row 606-E, the FF circuits in the third row 606-E shift their data to the corresponding FF circuits in the fourth row 608-E, the FF circuits in the fourth row 608-E shift their data to the corresponding FF circuits in the fifth row 610-E, and the FF circuits in the fifth row 610-E shift their data to the corresponding FF circuits in the sixth row 612-E.

In addition, the output of each FF circuit is provided as a one-bit output signal de_deser<n>. This output may also be triggered by clk0_div4. In the implementation shown, there are twenty-four DFF circuits that output the signals denoted de_deser<23>, de_deser<22>, de_deser<21>, de_deser<20>, ..., and de_deser <0>. These signals may be output in parallel from the even deserializer 600-E as a 24-bit deserialized even data signal de_deser<23:0>. In particular, the first row 602-E may output de_deser<23> through de_deser<20>; the second row 604-E may output de_deser<19> through de_deser<16>; the third row 606-E may output de_deser<15> through de_deser<12>; the fourth row 608-E may output de_deser<11> through de_deser<8>; the fifth row 610-E may output de_deser<7> through de_deser<4>; and the sixth row 612-E may output de_deser<3> through de_deser<0>.

In the implementation depicted in FIG. 6B, the odd deserializer 600-O includes six rows of four flip-flop (FF) circuits (602-O, 604-O, 606-O, 608-O, 610-O, and 612-O). The upper four bits of the odd data signals, denoted do<7>, do<6>, do<5>, and do<4>, may be provided to the data inputs of a first row 602-O of flip-flop (FF) circuits. The second clock signal CLK_DIV4 shifted by 180 degrees (i.e. clk180_div4 which is the odd version of CLK_DIV4) may be provided to the clock inputs of the FF circuits.

As triggered by clk180_div4, the FF circuits in each row shifts its data to corresponding FF circuits in the row below. As depicted, the FF circuits in the first row 602-O shifts its data to the corresponding FF circuit in the second row 604-O. At the same time, the FF circuits in the second row 604-O shift their data to the corresponding FF circuits in the third row 606-O, the FF circuits in the third row 606-O shift their data to the corresponding FF circuits in the fourth row 608-O, the FF circuits in the fourth row 608-O shift their data to the corresponding FF circuits in the fifth row 610-O, and the FF circuits in the fifth row 610-O shift their data to the corresponding FF circuits in the sixth row 612-O.

In addition, the output of each FF circuit is provided as a one-bit output signal do_deser<n>. This output may also be triggered by clk180_div4. In the implementation shown, there are twenty-four DFF circuits that output the signals denoted do_deser<23>, do_deser<22>, do_deser<21>, do_deser<20>, ..., and do_deser <0>. These signals may be output in parallel from the deserializer 600-O as a 24-bit deserialized even data signal do_deser<23:0>. In particular, the first row 602-O may output do_deser<23> through do_deser<20>; the second row 604-O may output do_deser<19> through do_deser<16>; the third row 606-O may output do_deser<15> through do_deser<12>; the fourth row 608-O may output do_deser<11> through do_deser<8>; the fifth row 610-O may output do_deser<7> through do_deser<4>; and the sixth row 612-O may output do_deser<3> through do_deser<0>.

Figure 7A:
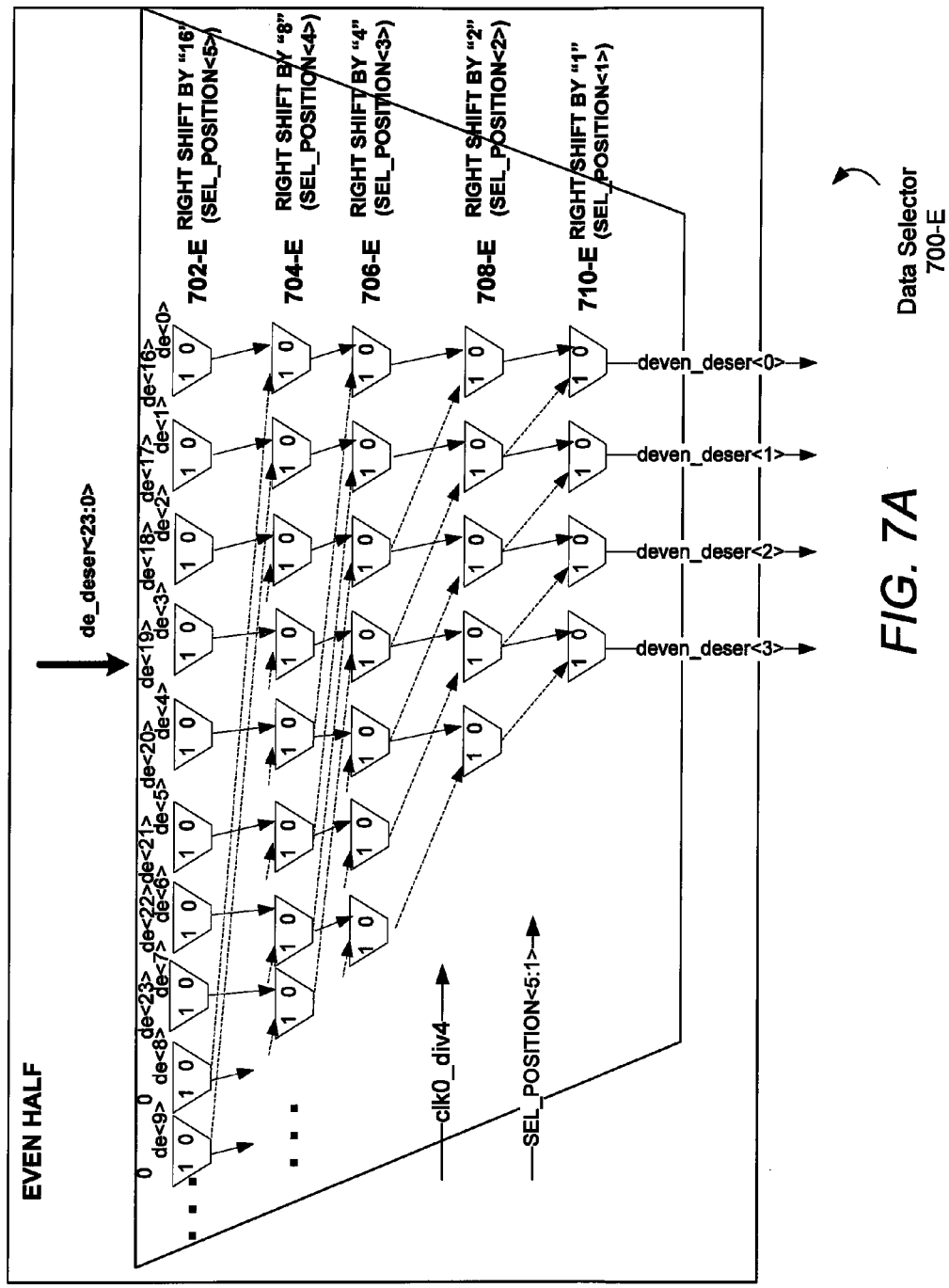
FIGS. 7A and 7B depict, respectively, exemplary implementations of even and odd data selectors for a floating-tap generation circuit in accordance with an embodiment of the invention.
Figure 7B:
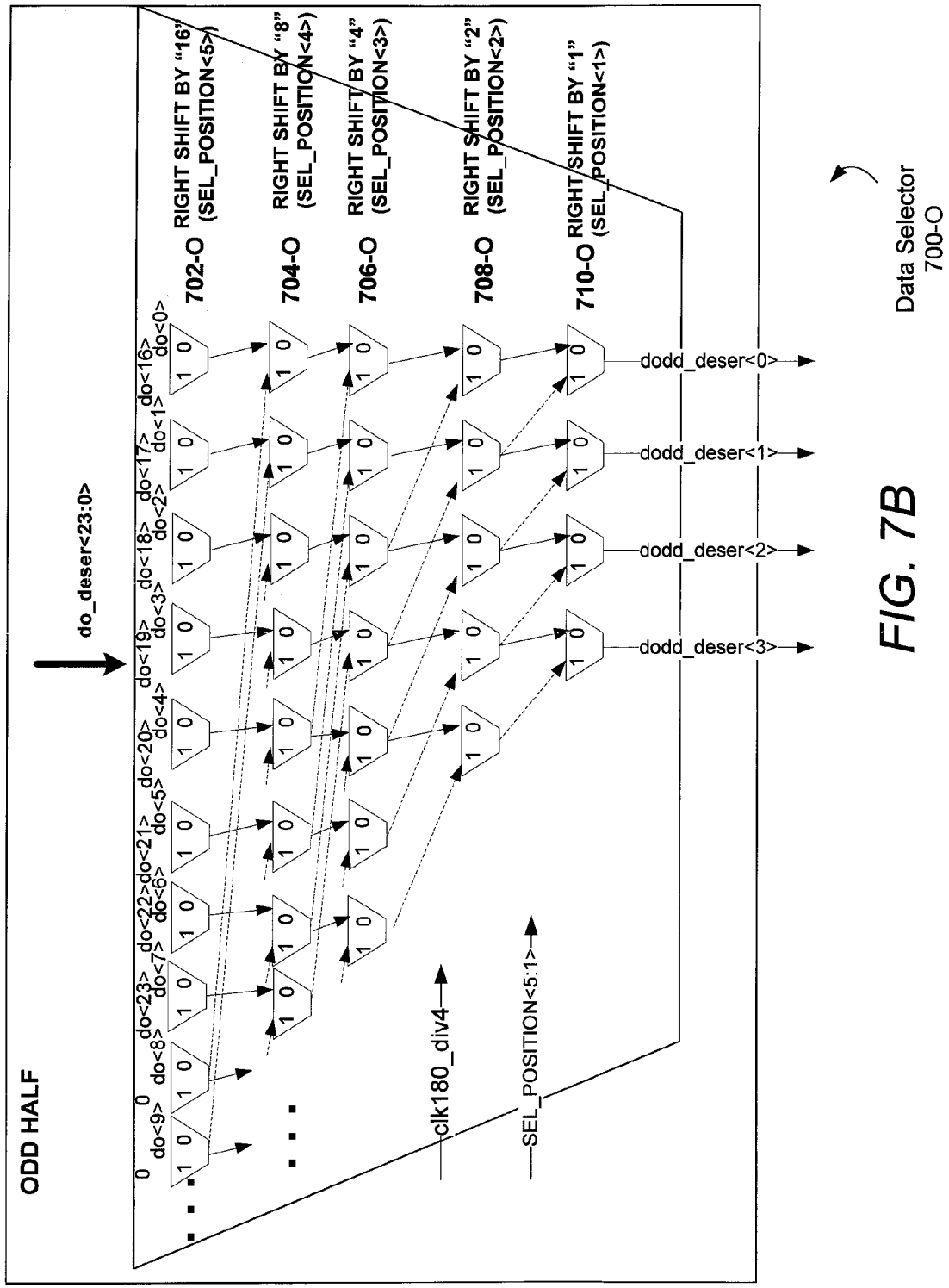

FIGS. 7A and 7B depict, respectively, exemplary implementations of even and odd data selectors for a floating-tap generation circuit in accordance with an embodiment of the invention. As described below, the implementations use a barrel shifter structure. Together, the even data selector 700-E in FIG. 7A and the odd data selector 700-O in FIG. 7B form the data selector 700 in FIG. 4.

In the implementation shown in FIG. 7A, the even data selector 700-E includes five rows or levels (702-E, 704-E, 706-E, 708-E, and 710-E) of selector circuits. Each selector circuit is controlled by one bit of the SEL_POSITION signal and is clocked by the clock signal clk0_div4. The SEL_POSITION signal indicates the floating tap position, and clk0_div4 is the second clock signal which may be generated by dividing the first clock signal clk0 by four.

The inputs to the first row 702-E of selectors include the even deserialized signal de_deser<23:0>. In particular, the first (0) inputs of the sixteen selectors in the first row 702-E receive de_deser<0> through de_deser<15>, respectively. The second (1) inputs of the first eight of the sixteen selectors in the first row 702-E receive de_deser<16> through de_deser<23>, respectively.

The first row 702-E operates to perform a right shift by sixteen based on the value of SEL_POSITION<5>. If SEL_POSITION<5>=0, then a first input (the 0 input) is selected by each of the selector circuits in the first row 702-E. On the other hand, if SEL_POSITION<5>=1, then a second input (the 1 input) is selected by each of the selector circuits in the first row 702-E.

The second row 704-E operates to perform a right shift by eight based on the value of SEL_POSITION<4>. If SEL_POSITION<4>=0, then a first input (the 0 input) is selected by each of the selector circuits in the second row 704-E. On the other hand, if SEL_POSITION<4>=1, then a second input (the 1 input) is selected by each of the selector circuits in the second row 704-E.

The third row 706-E operates to perform a right shift by four based on the value of SEL_POSITION<3>. If SEL_POSITION<3>=0, then a first input (the 0 input) is selected by each of the selector circuits in the third row 706-E. On the other hand, if SEL_POSITION<3>=1, then a second input (the 1 input) is selected by each of the selector circuits in the third row 706-E.

The fourth row 708-E operates to perform a right shift by two based on the value of SEL_POSITION<2>. If SEL_POSITION<2>=0, then a first input (the 0 input) is selected by each of the selector circuits in the fourth row 708-E. On the other hand, if SEL_POSITION<2>=1, then a second input (the 1 input) is selected by each of the selector circuits in the fourth row 708-E.

The fifth row 710-E operates to perform a right shift by one based on the value of SEL_POSITION<1>. If SEL_POSITION<1>=0, then a first input (the 0 input) is selected by each of the selector circuits in the fifth row 710-E. On the other hand, if SEL_POSITION<1>=1, then a second input (the 1 input) is selected by each of the selector circuits in the fifth row 710-E.

As shown in FIG. 7A, the output of the four selectors in the fifth row 710-E provide the four bits of the even multiple-bit signal deven_deser<3:0>. This even multiple-bit signal deven_deser<3:0> is utilized by the high-speed multiplexer 900 as described below.

In the implementation shown in FIG. 7B, the odd data selector 700-O includes five rows or levels (702-O, 704-O, 706-O, 708-O, and 710-O) of selector circuits. Each selector circuit is controlled by one bit of the SEL_POSITION signal and is clocked by the clk180_div4 clock signal. The SEL_POSITION signal indicates the floating tap position, and clk180_div4 is the second clock signal (shifted by 180 degrees) which may be generated by dividing the first clock signal (shifted by 180 degrees) clk180 by four.

The inputs to the first row 702-O of selectors include the odd deserialized signal do_deser<23:0>. In particular, the first (0) inputs of the sixteen selectors in the first row 702-O receive do_deser<0> through do_deser<15>, respectively. The second (1) inputs of the first eight of the sixteen selectors in the first row 702-O receive do_deser<16> through do_deser<23>, respectively.

The first row 702-O operates to perform a right shift by sixteen based on the value of SEL_POSITION<5>. If SEL_POSITION<5>=0, then a first input (the 0 input) is selected by each of the selector circuits in the first row 702-O. On the other hand, if SEL_POSITION<5>=1, then a second input (the 1 input) is selected by each of the selector circuits in the first row 702-O.

The second row 704-O operates to perform a right shift by eight based on the value of SEL_POSITION<4>. If SEL_POSITION<4>=0, then a first input (the 0 input) is selected by each of the selector circuits in the second row 704-O. On the other hand, if SEL_POSITION<4>=1, then a second input (the 1 input) is selected by each of the selector circuits in the second row 704-O.

The third row 706-O operates to perform a right shift by four based on the value of SEL_POSITION<3>. If SEL_POSITION<3>=0, then a first input (the 0 input) is selected by each of the selector circuits in the third row 706-O. On the other hand, if SEL_POSITION<3>=1, then a second input (the 1 input) is selected by each of the selector circuits in the third row 706-O.

The fourth row 708-O operates to perform a right shift by two based on the value of SEL_POSITION<2>. If SEL_POSITION<2>=0, then a first input (the 0 input) is selected by each of the selector circuits in the fourth row 708-O. On the other hand, if SEL_POSITION<2>=1, then a second input (the 1 input) is selected by each of the selector circuits in the fourth row 708-O.

The fifth row 710-O operates to perform a right shift by one based on the value of SEL_POSITION<1>. If SEL_POSITION<1>=0, then a first input (the 0 input) is selected by each of the selector circuits in the fifth row 710-O. On the other hand, if SEL_POSITION<1>=1, then a second input (the 1 input) is selected by each of the selector circuits in the fifth row 710-O.

As shown in FIG. 7B, the output of the four selectors in the fifth row 710-O provide the four bits of the odd multiple-bit signal dodd_deser<3:0>. This odd multiple-bit signal dodd_deser<3:0> is utilized by the high-speed multiplexer 900 as described below.

Figure 8A:
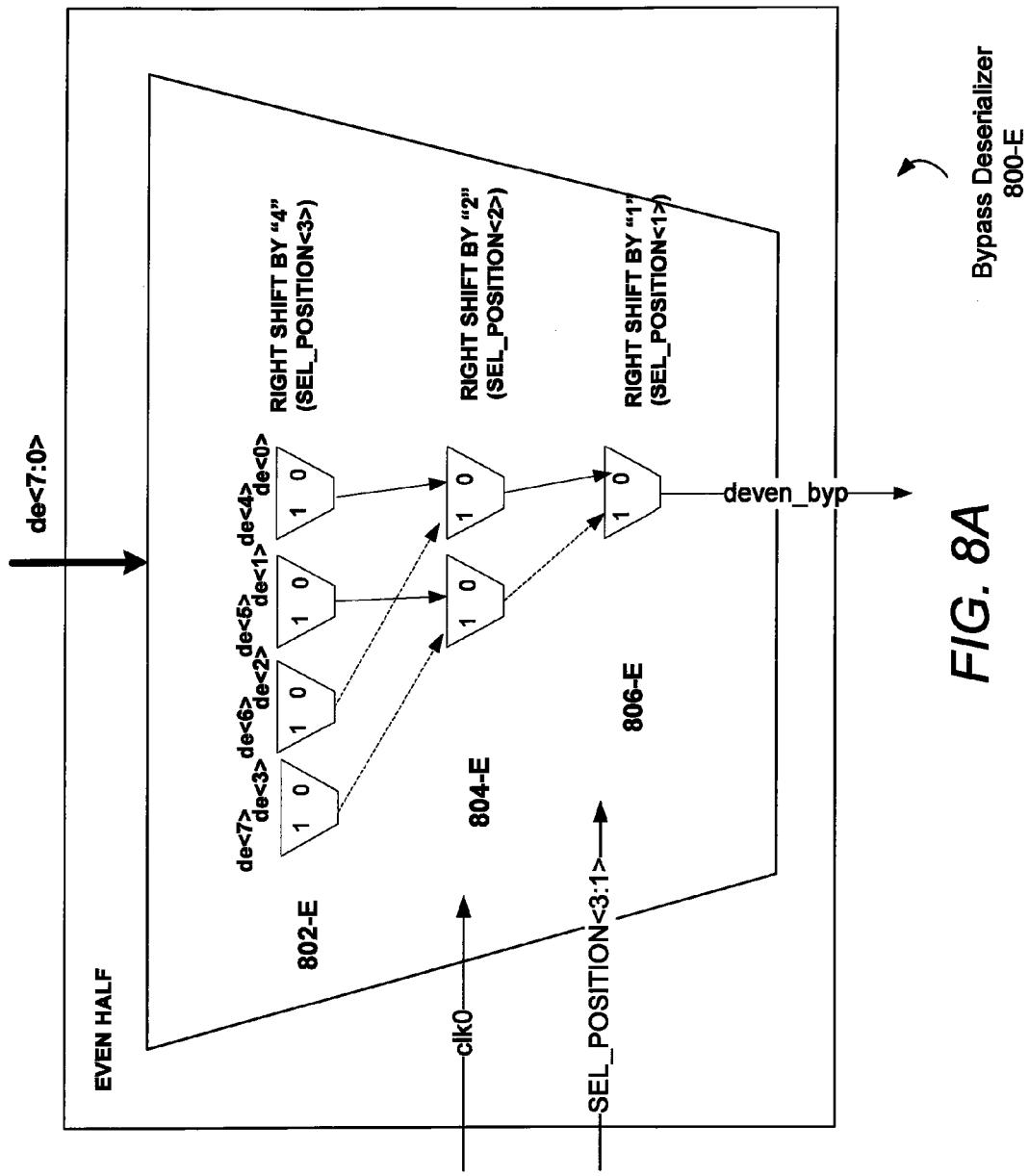
FIGS. 8A and 8B depict, respectively, exemplary implementations of even and odd bypass deserializers for a floating-tap generation circuit in accordance with an embodiment of the invention.
Figure 8B:
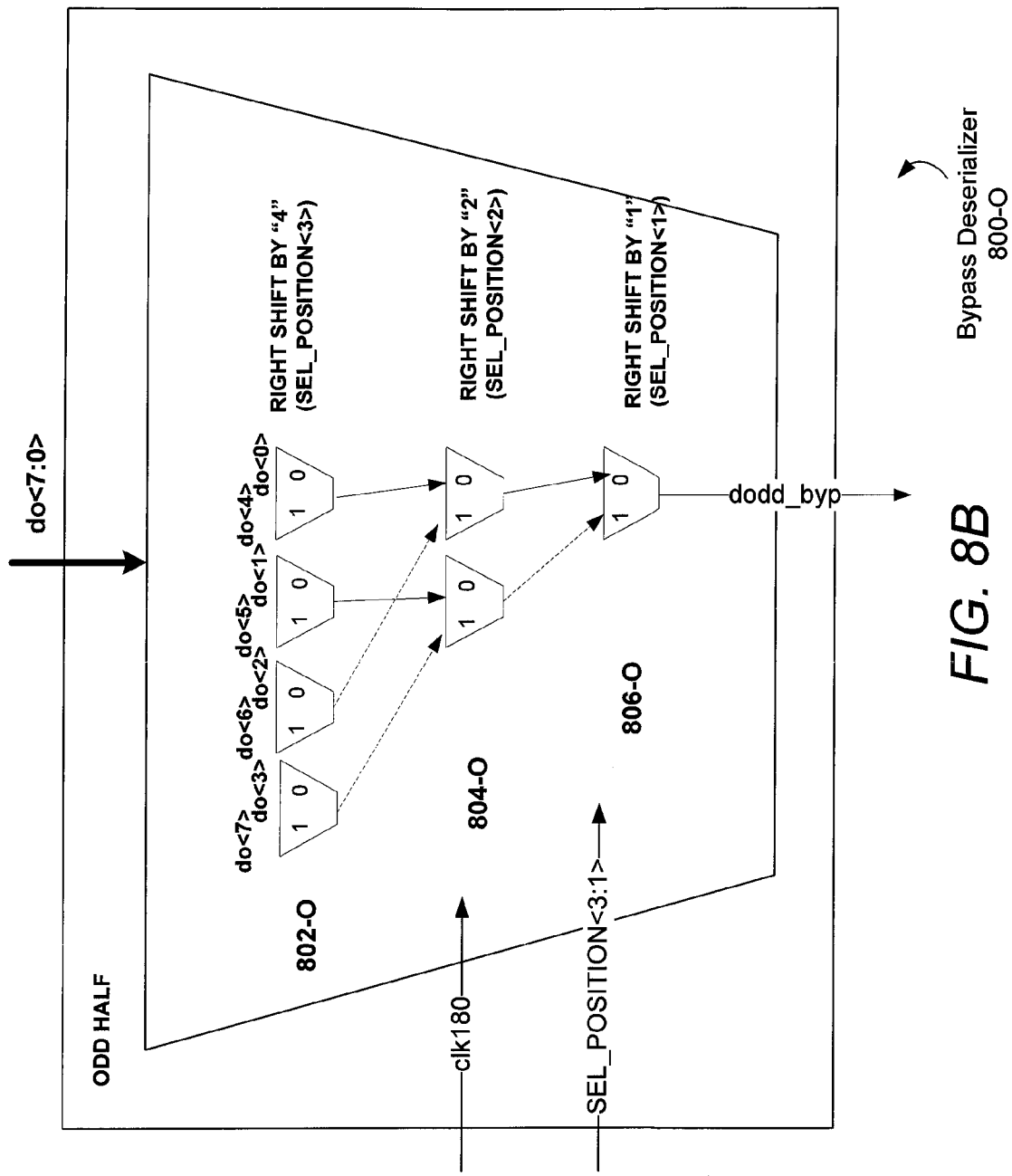

FIGS. 8A and 8B depict, respectively, exemplary implementations of even and odd bypass deserializers for a floating-tap generation circuit in accordance with an embodiment of the invention. Together, the even bypass deserializer (800-E) in FIG. 8A and the odd bypass deserializer (800-O) in FIG. 8B form the bypass deserializer 800 in FIG. 4.

In the implementation shown in FIG. 8A, the even bypass deserializer 800-E includes three rows or levels (802-E, 804-E, and 806-E) of selector circuits. Each selector circuit is controlled by one bit of the floating tap position signal SEL_POSITION and is clocked by the first clock signal clk0. Note that the first clock signal clk0 is four times faster than the second clock signal clk0_div4.

The inputs to the first row 802-E of selectors include the even parallel data signal de<7:0> from the high-speed shift register 500. In particular, the first (0) inputs of the four selectors in the first row 802-E receive de<0> through de<3>, respectively. The second (1) inputs of the four selectors in the first row 802-E receive de<4> through de<7>, respectively.

The first row 802-E operates to perform a right shift by four based on the value of SEL_POSITION<3>. If SEL_POSITION<3>=0, then a first input (the 0 input) is selected by each of the selector circuits in the first row 802-E. On the other hand, if SEL_POSITION<3>=1, then a second input (the 1 input) is selected by each of the selector circuits in the first row 802-E.

The second row 804-E operates to perform a right shift by two based on the value of SEL_POSITION<2>. If SEL_POSITION<2>=0, then a first input (the 0 input) is selected by each of the selector circuits in the second row 804-E. On the other hand, if SEL_POSITION<2>=1, then a second input (the 1 input) is selected by each of the selector circuits in the second row 804-E.

The third row 806-E (which has a single selector) operates to perform a right shift by one based on the value of SEL_POSITION<1>. If SEL_POSITION<1>=0, then a first input (the 0 input) is selected by each of the selector circuits in the third row 806-E. On the other hand, if SEL_POSITION<1>=1, then a second input (the 1 input) is selected by each of the selector circuits in the third row 806-E.

The output of the selector of the third row 806-E is the even bypass bit signal deven_byp. This even bypass bit signal deven_byp is utilized by the high-speed multiplexer 900 as described below.

In the implementation shown in FIG. 8B, the odd bypass deserializer 800-O includes three rows or levels (802-O, 804-O, and 806-O) of selector circuits. Each selector circuit is controlled by one bit of the floating tap position signal SEL_POSITION and is clocked by the first clock signal (phase shifted by 180 degrees) clk180. Note that the first clock signal clk180 is four times faster than the second clock signal clk180_div4.

The inputs to the first row 802-O of selectors include the odd parallel data signal do<7:0> from the high-speed shift register 500. In particular, the first (0) inputs of the four selectors in the first row 802-O receive do<0> through do<3>, respectively. The second (1) inputs of the four selectors in the first row 802-O receive do<4> through do<7>, respectively.

The first row 802-O operates to perform a right shift by four based on the value of SEL_POSITION<3>. If SEL_POSITION<3>=0, then a first input (the 0 input) is selected by each of the selector circuits in the first row 802-O. On the other hand, if SEL_POSITION<3>=1, then a second input (the 1 input) is selected by each of the selector circuits in the first row 802-O.

The second row 804-O operates to perform a right shift by two based on the value of SEL_POSITION<2>. If SEL_POSITION<2>=0, then a first input (the 0 input) is selected by each of the selector circuits in the second row 804-O. On the other hand, if SEL_POSITION<2>=1, then a second input (the 1 input) is selected by each of the selector circuits in the second row 804-O.

The third row 806-O (which has a single selector) operates to perform a right shift by one based on the value of SEL_POSITION<1>. If SEL_POSITION<1>=0, then a first input (the 0 input) is selected by each of the selector circuits in the third row 806-O. On the other hand, if SEL_POSITION<1>=1, then a second input (the 1 input) is selected by each of the selector circuits in the third row 806-O.

The output of the selector of the third row 806-O is the odd bypass bit signal dodd_byp. This odd bypass bit signal dodd_byp is utilized by the high-speed multiplexer 900 as described below.

Figure 9A:
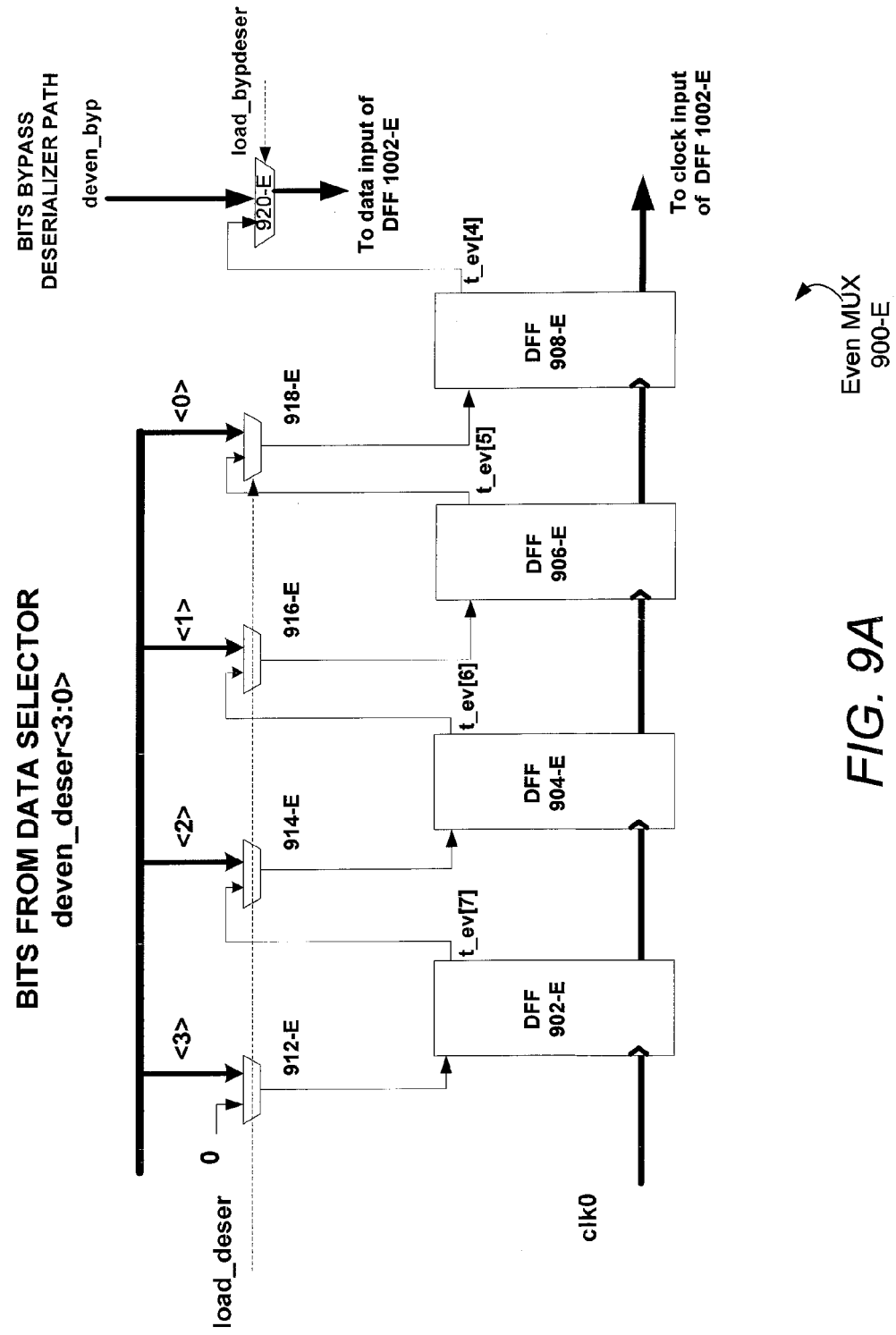
FIGS. 9A and 9B depict, respectively, exemplary implementations of even and odd high-speed multiplexers for a floating-tap generation circuit in accordance with an embodiment of the invention.
Figure 9B:
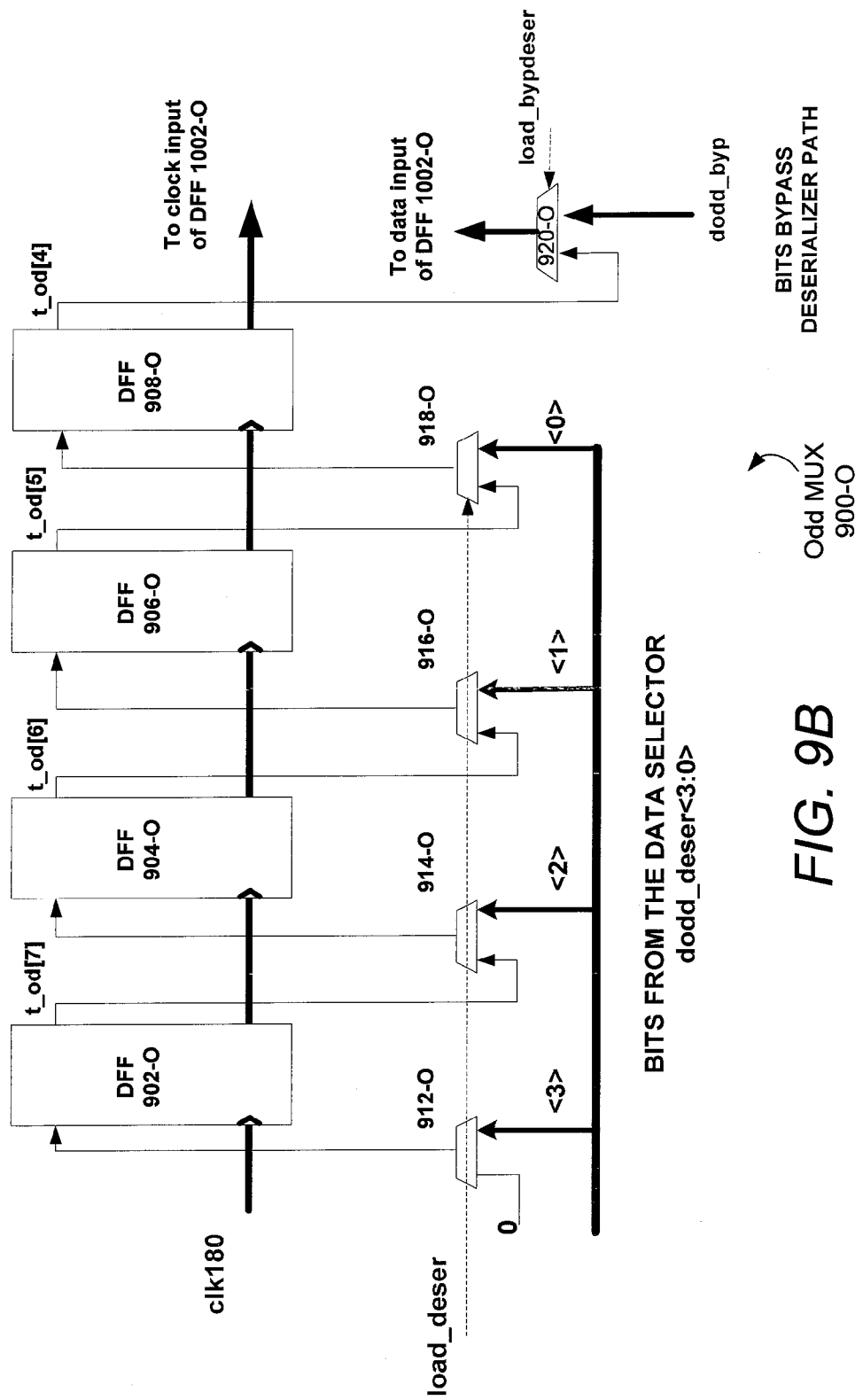

FIGS. 9A and 9B depict, respectively, exemplary implementations of even and odd high-speed multiplexers for a floating-tap generation circuit in accordance with an embodiment of the invention. Together, the even high-speed multiplexer (even MUX) 900-E in FIG. 9A and the odd high-speed multiplexer (odd MUX) 900-O in FIG. 9B form the high-speed multiplexer 900 in FIG. 4.

Referring to FIG. 9A, the structure and operation of the even MUX 900-E are now described in detail. As shown, the even MUX 900-E may include four D flip-flop (DFF) circuits in series (902-E, 904-E, 906-E, and 908-E). These four DFFs are each triggered by the first clock signal (with zero phase shift) clk0 (i.e. the even version of the first clock signal).

The data inputs to the four DFF circuits (902-E, 904-E, 906-E, and 908-E) are received from corresponding selectors (912-E, 914-E, 916-E, and 918-E, respectively). Each selector may select one of two inputs based on a control signal load_deser. For each selector, the first input may be selected if load_deser is low (disabled), and the second input may be selected if load_deser is high (enabled).

The first selector 912-E receives a low state (0) at its first input and deven_deser<3> from the data selector 700 at its second input. The output of the first selector 912-E is provided to the data input of the first DFF 902-E. The first DFF 902-E outputs a tap signal denoted t_ev[7].

The second selector 914-E receives the data output t_ev[7] of the first DFF 902-E at its first input and deven_deser<2> from the data selector 700 at its second input. The output of the second selector 914-E is provided to the data input of the second DFF 904-E. The second DFF 904-E outputs a tap signal denoted t_ev[6].

The third selector 916-E receives the data output t_ev[6] of the second DFF 904-E at its first input and deven_deser<1> from the data selector 700 at its second input. The output of the third selector 916-E is provided to the data input of the third DFF 906-E. The third DFF 906-E outputs a tap signal denoted t_ev[5].

Finally, the fourth selector 918-E receives the data output t_ev[5] of the third DFF 906-E at its first input and deven_deser<0> from the data selector 700 at its second input. The output of the fourth selector 918-E is provided to the data input of the fourth DFF 908-E. The fourth DFF 908-E outputs a tap signal denoted t_ev[4].

Operationally, during a cycle when the control signal load_deser is enabled, the four bits deven_deser<3:0> are loaded into the four DFF circuits. During cycles when load_deser is disabled, the bits in the DFF circuits are shifted from left to right.

An output selector 920-E receives the data output t_ev[4] of the fourth DFF 908-E at a first input and the even bypass bit signal deven_byp from the even bypass deserializer 800-E at a second input. The output selector 920-E selects one of the inputs based on a control signal load_bypdeser. If load_bypdeser is enabled, then deven_byp is output by the output selector 920-E. If load_bypdeser is disabled, then the first input (from the output of the fourth DFF 908-E) is output by the output selector 920-E. The selected output is provided from the output selector 920-E to the data input of a data input of a DFF circuit 1002-E in the tap generation circuit 1000.

Referring to FIG. 9B, the structure and operation of the odd MUX 900-O are now described in detail. As shown, the odd MUX 900-O may include four D flip-flop (DFF) circuits in series (902-O, 904-O, 906-O, and 908-O). These four DFFs are each triggered by the first clock signal (with 180 degrees phase shift) clk180 (i.e. the odd version of the first clock signal).

The data inputs to the four DFF circuits (902-O, 904-O, 906-O, and 908-O) are received from corresponding selectors (912-O, 914-O, 916-O, and 918-O, respectively). Each selector may select one of two inputs based on a control signal load_deser. For each selector, the first input may be selected if load_deser is low (disabled), and the second input may be selected if load_deser is high (enabled).

The first selector 912-O receives a low state (0) at its first input and dodd_deser<3> from the data selector 700 at its second input. The output of the first selector 912-O is provided to the data input of the first DFF 902-O. The first DFF 902-O outputs a tap signal denoted t_od[7].

The second selector 914-O receives the data output t_od[7] of the first DFF 902-O at its first input and dodd_deser <2> from the data selector 700 at its second input. The output of the second selector 914-O is provided to the data input of the second DFF 904-O. The second DFF 904-O outputs a tap signal denoted t_od[6].

The third selector 916-O receives the data output t_od[6] of the second DFF 904-O at its first input and dodd_deser <1> from the data selector 700 at its second input. The output of the third selector 916-O is provided to the data input of the third DFF 906-O. The third DFF 906-O outputs a tap signal denoted t_od[5].

Finally, the fourth selector 918-O receives the data output t_od[5] of the third DFF 906-O at its first input and dodd_deser <0> from the data selector 700 at its second input. The output of the fourth selector 918-O is provided to the data input of the fourth DFF 908-O. The fourth DFF 908-O outputs a tap signal denoted t_od[4].

Operationally, during a cycle when the control signal load_deser is enabled, the four bits dodd_deser <3:0> are loaded into the four DFF circuits. During cycles when load_deser is disabled, the bits in the DFF circuits are shifted from left to right.

An output selector 920-O receives the data output t_od[4] of the fourth DFF 908-O at a first input and the odd bypass bit signal dodd_byp from the odd bypass deserializer 800-O at a second input. The output selector 920-O selects one of the inputs based on a control signal load_bypdeser. If load_bypdeser is enabled, then dodd_byp is output by the output selector 920-O. If load_bypdeser is disabled, then the first input (from the output of the fourth DFF 908-O) is output by the output selector 920-O. The selected output is provided from the output selector 920-O to the data input of a data input of a DFF circuit 1002-O in the tap generation circuit 1000.

Figure 10:
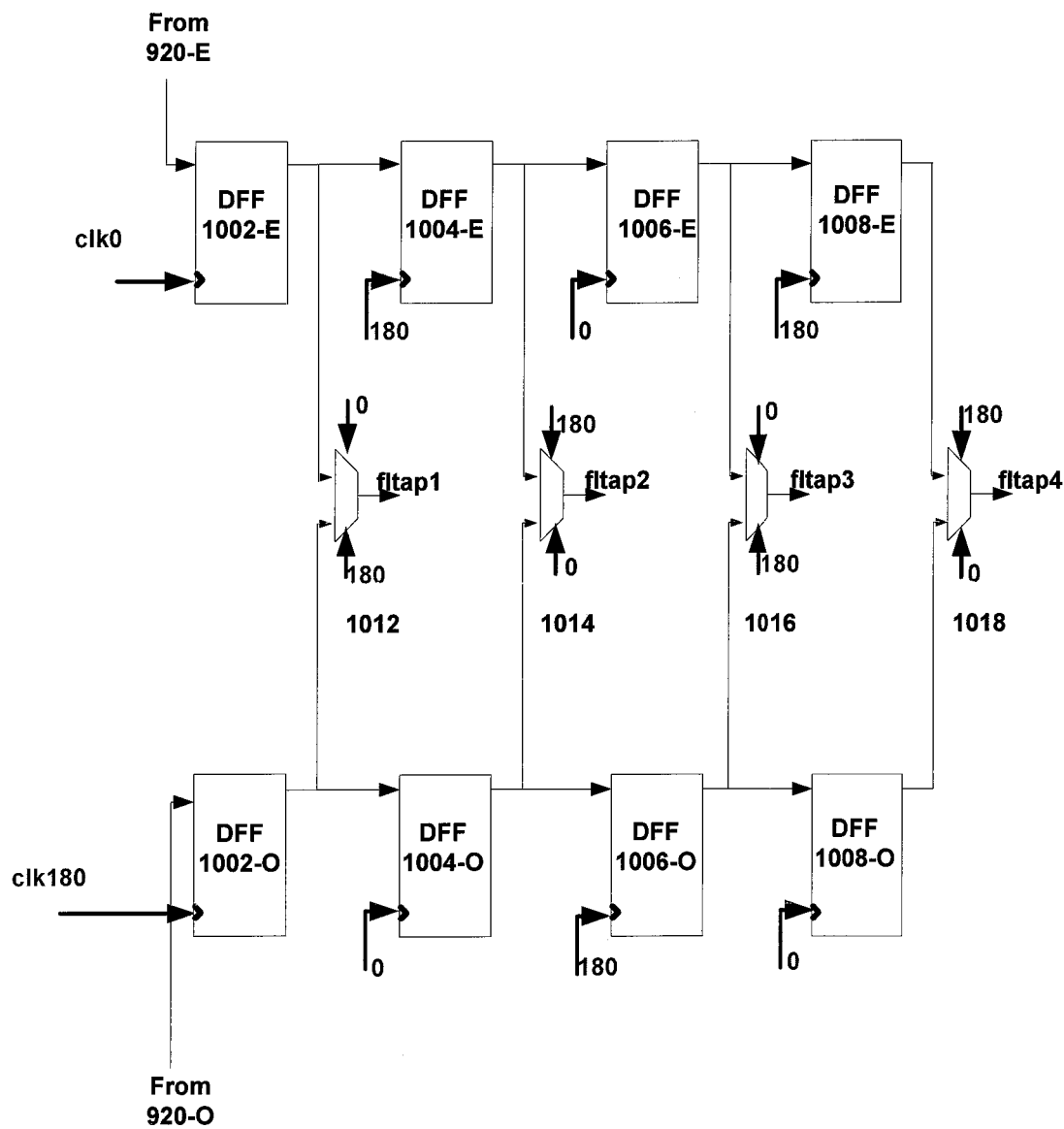
FIG. 10 depicts an exemplary implementation of a tap generation circuit for a floating-tap generation circuit in accordance with an embodiment of the invention.

FIG. 10 depicts an exemplary implementation of a tap generation circuit 1000 for a floating-tap generation circuit in accordance with an embodiment of the invention. As depicted, the tap generation circuit 1000 includes a series of even DFF circuits (1002-E, 1004-E, 1006-E, and 1008-E) and a series of odd DFF circuits (1002-O, 1004-O, 1006-O, and 1008-O).

A first even DFF circuit 1002-E receives its data input from the output selector 920-E of the even MUX 900-E and receives the even clock clk0 at its clock input. The data output from the first even DFF circuit 1002-E is provided to a first input of the first floating tap output selector 1012 and also to the data input of the second even DFF circuit 1004-E.

A second even DFF circuit 1004-E receives its data input from the output of the first even DFF circuit 1002-E and receives the odd clock clk180 at its clock input. The data output from the second even DFF circuit 1004-E is provided to a first input of the second floating tap output selector 1014 and also to the data input of the third even DFF circuit 1006-E.

A third even DFF circuit 1006-E receives its data input from the output of the second even DFF circuit 1004-E and receives clk0 at its clock input. The data output from the third even DFF circuit 1006-E is provided to a first input of the third floating tap output selector 1014 and also to the data input of the fourth even DFF circuit 1008-E.

Finally, a fourth even DFF circuit 1008-E receives its data input from the output of the third even DFF circuit 1006-E and receives clk180 at its clock input. The data output from the fourth even DFF circuit 1008-E is provided to a first input of the fourth floating tap output selector 1018.

A first odd DFF circuit 1002-O receives its data input from the output selector 920-O of the odd MUX 900-O and receives clk180 at its clock input. The data output from the first odd DFF circuit 1002-O is provided to a second input of the first floating tap output selector 1012 and also to the data input of the second odd DFF circuit 1004-O.

A second odd DFF circuit 1004-O receives its data input from the output of the first odd DFF circuit 1002-O and receives clk0 at its clock input. The data output from the second odd DFF circuit 1004-O is provided to a second input of the second floating tap output selector 1014 and also to the data input of the third odd DFF circuit 1006-O.

A third odd DFF circuit 1006-O receives its data input from the output of the second odd DFF circuit 1004-O and receives clk180 at its clock input. The data output from the third odd DFF circuit 1006-O is provided to a second input of the third floating tap output selector 1014 and also to the data input of the fourth odd DFF circuit 1008-O.

Finally, a fourth odd DFF circuit 1008-O receives its data input from the output of the third odd DFF circuit 1006-O and receives clk0 at its clock input. The data output from the fourth odd DFF circuit 1008-O is provided to a second input of the fourth floating tap output selector 1018.

The first floating tap output selector 1012 receives the output of the first even DFF circuit 1002-E at a first data input and the output of the first odd DFF circuit 1002-O at a second data input. The first floating tap output selector 1012 also receives clk0 at a first control input and clk180 at a second control input. When triggered by a transition in clk0, the first floating tap output selector 1012 selects the first data input (from the first even DFF circuit 1002-E) for output as the first floating tap signal fltap1. When triggered by a transition in clk180, the first floating tap output selector 1012 selects the second data input (from the first odd DFF circuit 1002-O) for output as the first floating tap signal fltap1.

The second floating tap output selector 1014 receives the output of the second even DFF circuit 1004-E at a first data input and the output of the second odd DFF circuit 1004-O at a second data input. The second floating tap output selector 1014 also receives clk180 at a first control input and clk0 at a second control input. When triggered by a transition in clk180, the second floating tap output selector 1014 selects the first data input (from the second even DFF circuit 1004-E) for output as the second floating tap signal fltap2. When triggered by a transition in clk0, the second floating tap output selector 1014 selects the second data input (from the second odd DFF circuit 1004-O) for output as the second floating tap signal fltap2.

The third floating tap output selector 1016 receives the output of the third even DFF circuit 1006-E at a first data input and the output of the third odd DFF circuit 1006-O at a second data input. The third floating tap output selector 1016 also receives clk0 at a first control input and clk180 at a second control input. When triggered by a transition in clk0, the third floating tap output selector 1016 selects the first data input (from the third even DFF circuit 1006-E) for output as the third floating tap signal fltap3. When triggered by a transition in clk180, the third floating tap output selector 1016 selects the second data input (from the third odd DFF circuit 1006-O) for output as the third floating tap signal fltap3.

The fourth floating tap output selector 1018 receives the output of the fourth even DFF circuit 1008-E at a first data input and the output of the fourth odd DFF circuit 1008-O at a second data input. The fourth floating tap output selector 1018 also receives clk180 at a first control input and clk0 at a second control input. When triggered by a transition in clk180, the fourth floating tap output selector 1018 selects the first data input (from the fourth even DFF circuit 1008-E) for output as the fourth floating tap signal fltap4. When triggered by a transition in clk0, the fourth floating tap output selector 1018 selects the second data input (from the fourth odd DFF circuit 1008-O) for output as the fourth floating tap signal fltap4.

Figure 11:
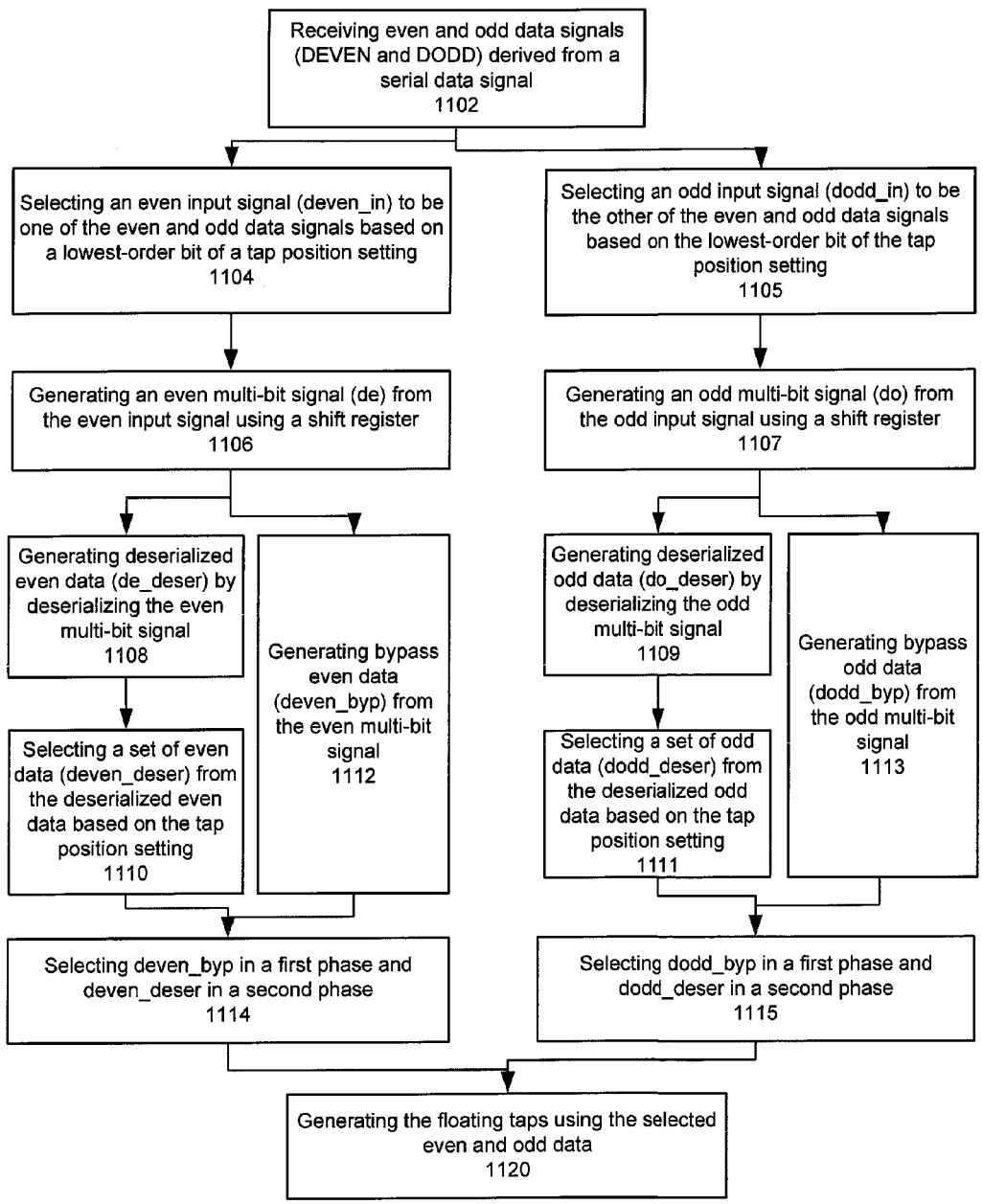
FIG. 11 is a flow chart of a method of generating a plurality of floating taps for DFE in accordance with an embodiment of the invention.

FIG. 11 is a flow chart of a method 1100 of generating a plurality of floating taps for DFE in accordance with an embodiment of the invention. In an exemplary implementation, the method 1100 may be performed using the circuitry described above.

Per step 1102, even and odd data signals (e.g., DEVEN and DODD) are received. These even and odd data signals may be derived from a serial data signal. Thereafter, the data signals may be processed in parallel by steps in two processing paths: an "even" path including steps 1104, 1106, 1108, 1110, 1112, and 1114; and an "odd" path including steps 1105, 1107, 1109, 1111, 1113, and 1115.

Per step 1104, an even input signal (e.g., deven_in) is selected to be one of the even and odd data signals. The selection may be based on a lowest-order bit of a tap position setting. Similarly, per step 1105, an odd input signal (e.g., dodd_in) is selected to be one of the even and odd data signals. The selection may be based on a lowest-order bit of a tap position setting.

Per step 1106, an even multi-bit signal (e.g., de) may be generated from the even input signal using a shift register. Similarly, per step 1107, an odd multi-bit signal (e.g., do) may be generated from the odd input signal using a shift register.

Per step 1108, the even multi-bit signal may be deserialized to generate deserialized even data (e.g., de_deser). In addition, per step 1110, based on the tap position setting, a set of even data (e.g., deven_deser) may be selected from the deserialized even data. In parallel to steps 1108 and 1110, bypass even data (e.g., deven_byp) may be generated, per step 1112, from the even multi-bit signal.

Similarly, per step 1109, the odd multi-bit signal may be deserialized to generate deserialized odd data (e.g., do_deser). In addition, per step 1111, based on the tap position setting, a set of odd data (e.g., dodd_deser) may be selected from the deserialized odd data. In parallel to steps 1109 and 1111, bypass odd data (e.g., dodd_byp) may be generated, per step 1113, from the odd multi-bit signal.

Per step 1114, the even data may be selected for the floating taps. In particular, the bypass even data from the bypass deserializer 800 (e.g., deven_byp) may be selected in a first phase, and the even data from the data selector 700 (e.g., deven_deser) may be selected in a second phase (which begins when the first phase ends). Similarly, per step 1115, the odd data may be selected for the floating taps. In particular, the bypass odd data from the bypass deserializer 800 (e.g., dodd_byp) may be selected in a first phase, and the odd data from the data selector 700 (e.g., dodd_deser) may be selected in a second phase.

Finally, per step 1120, the floating taps may be generated using the selected even and odd data. This step may be performed by the tap generation circuit 1000 described above. The floating taps are thus generated from the "bypass" data during the first phase and from the "deserialized" data during the second phase.

Figure 12:
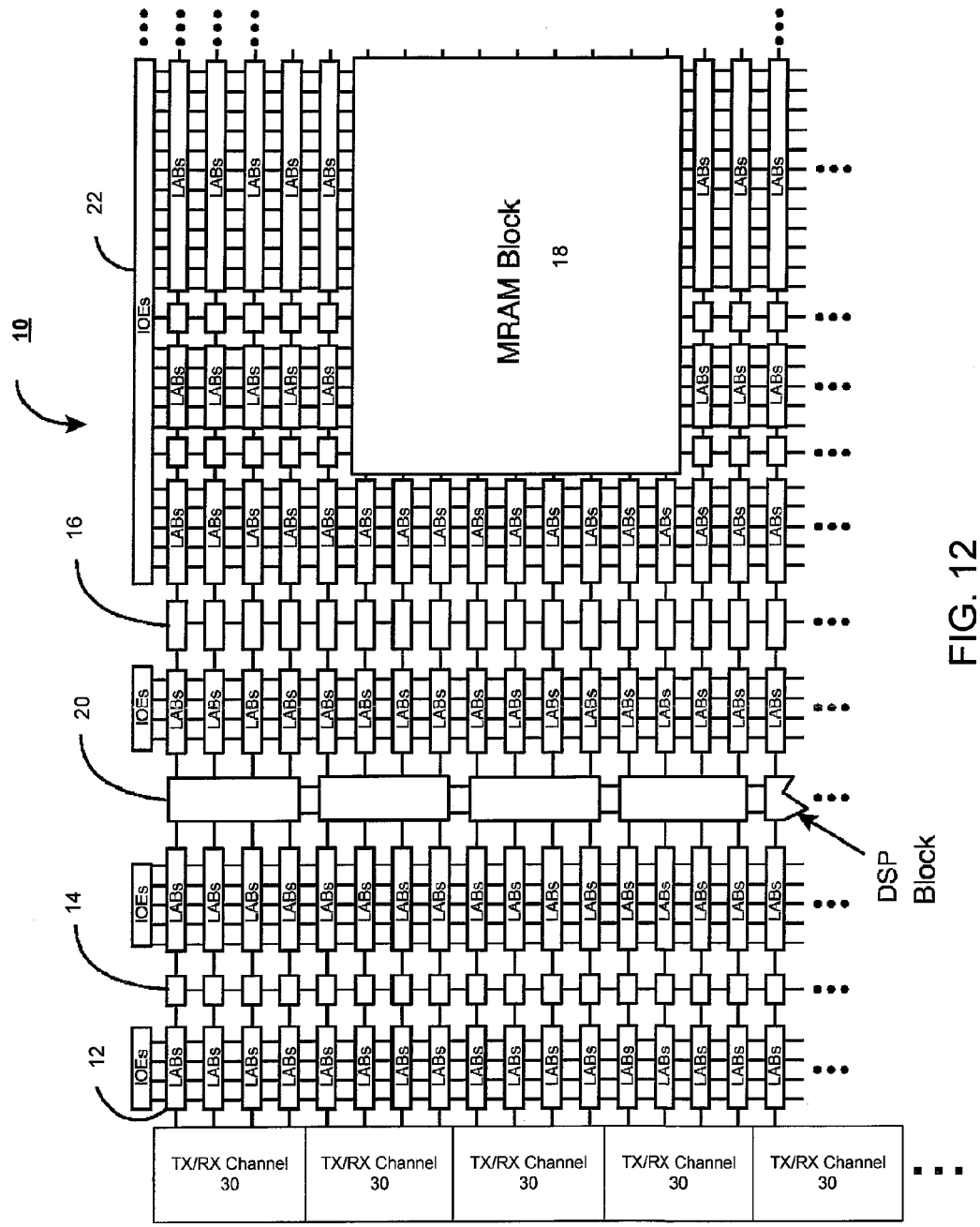
FIG. 12 is a simplified partial block diagram of a field programmable gate array (FPGA) 10 that can include aspects of the present invention

FIG. 12 is a simplified partial block diagram of a field programmable gate array (FPGA) 10 that can include aspects of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10. A transceiver (TX/RX) channel array may be arranged as shown, for example, with each TX/RX channel circuit 30 being coupled to several LABs. A TX/RX channel circuit 30 may include, among other circuitry, the receiver circuitry described herein.

It is to be understood that FPGA 10 is described herein for illustrative purposes only and that the present invention can be implemented in many different types of PLDs, FPGAs, and ASICs.

Figure 13:
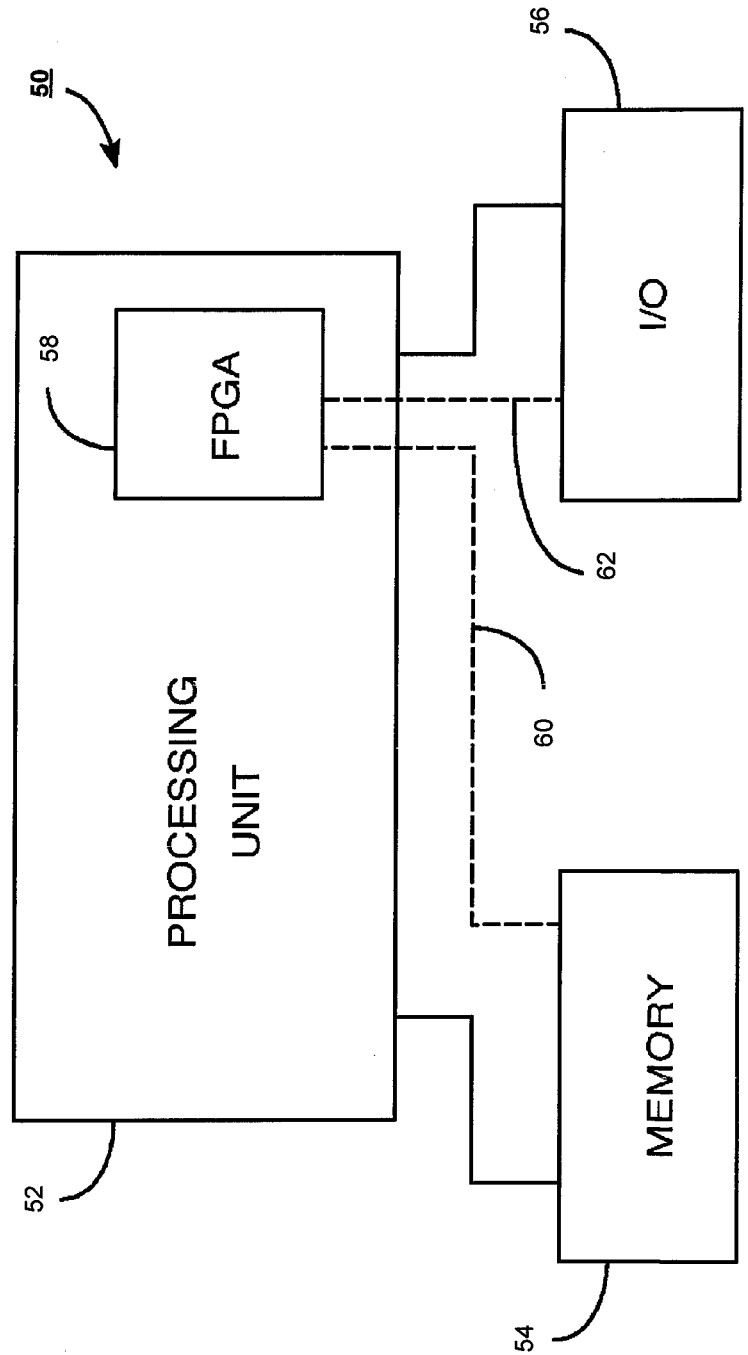
FIG. 13 shows a block diagram of an exemplary digital system 50 that includes an FPGA as one of several components and that may employ techniques of the present invention.

FIG. 13 shows a block diagram of an exemplary digital system 50 that includes an FPGA as one of several components and that may employ techniques of the present invention. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method of generating tap signals for decision feedback equalization, the method comprising:
    shifting a serial data signal at a first clock rate using shift registers to generate even and odd parallel data signals;
    de-serializing the even and odd parallel data signals at a second clock rate to generate even and odd deserialized data signals, wherein the first clock rate is a multiple of the second clock rate;
    selectively shifting the even and odd deserialized data signals based on a floating tap position setting to generate even and odd multiple-bit signals; and
    serializing the even and odd multiple-bit signals at the first clock rate so as to generate even and odd tap signals.

2. The method of claim 1 further comprising:
    selectively shifting the even and odd parallel data signals based on the floating tap position setting so as to generate bypass even and odd signals; and
    controllably selecting between the even and odd tap signals and the even and odd bypass signals to generate a plurality of floating taps.

3. The method of claim 2, wherein the plurality of floating taps comprises a group of floating taps at consecutive taps with a lowest tap being set by the floating tap position setting.

4. The method of claim 3 further comprising:
    scanning the floating tap position setting to cover a range of taps.

5. The method of claim 4, wherein a lowest tap in the range of taps is one greater than a highest tap of a set of fixed taps for the decision feedback equalization.

6. The method of claim 2 further comprising:
    determining a performance of the decision feedback equalization for different floating tap position settings; and
    selecting a specific floating tap position setting based on said performance.

7. A circuit for generating tap signals for decision feedback equalization, the circuit comprising:
    even and odd shift registers for shifting even and odd data signals at a first clock rate so as to generate even and odd parallel data signals;

a deserializer for de-serializing the even and odd parallel data signals at a second clock rate to generate even and odd deserialized data signals, wherein the first clock rate is a multiple of the second clock rate;

a data selector for selectively shifting the even and odd deserialized data signals based on a floating tap position setting to generate even and odd multiple-bit signals; and a multiplexer for serializing the even and odd multiple-bit signals at the first clock rate so as to generate even and odd tap signals.

8. The circuit of claim 7 further comprising:

a bypass deserializer for selectively shifting the even and odd parallel data signals based on the floating tap position setting so as to generate bypass even and odd signals; and a tap generation circuit for controllably selecting between the even and odd tap signals and the even and odd bypass signals to generate a plurality of floating taps.

9. The circuit of claim 8, wherein the plurality of floating taps comprises a group of floating taps at consecutive taps with a lowest tap being set by the floating tap position setting.

10. The circuit of claim 9 further comprising:

a control circuit for scanning the floating tap position setting to cover a range of taps.

11. The circuit of claim 10, wherein a lowest tap in the range of taps is one greater than a highest tap of a set of fixed taps for the decision feedback equalization.

12. The circuit of claim 8 further comprising:

a control circuit for determining a performance of the decision feedback equalization for different floating tap position settings and selecting a specific floating tap position setting based on said performance.

13. A decision feedback equalization circuit of a receiver for a data link, the decision feedback equalization circuit comprising:

a feedback filter for receiving a serial data signal and outputting a feedback signal, wherein said feedback filter comprises:

a fixed tap generator circuit for generating fixed taps for the feedback filter;

a floating tap generator circuit for generating floating taps for the feedback filter;

tap weight circuits for applying weights to the fixed and floating taps to generate weighted tap signals; and a summation node for receiving and adding together the weighted tap signals so as to generate said feedback signal, and wherein the floating tap generator circuit comprises:

even and odd shift registers for shifting even and odd data signals of said serial data signal at a first clock rate so as to generate even and odd parallel data signals;

a deserializer for de-serializing the even and odd parallel data signals at a second clock rate to generate even and odd deserialized data signals, wherein the first clock rate is a multiple of the second clock rate;

a data selector for selectively shifting the even and odd deserialized data signals based on a floating tap position setting to generate even and odd multiple-bit signals; and a multiplexer for serializing the even and odd multiple-bit signals at the first clock rate so as to generate even and odd tap signals.

14. The decision feedback equalization circuit of claim 13, wherein the floating tap generator circuit further comprises:

a bypass deserializer for selectively shifting the even and odd parallel data signals based on the floating tap position setting so as to generate bypass even and odd signals; and a tap generation circuit for controllably selecting between the even and odd tap signals and the even and odd bypass signals to generate the floating taps.

15. The decision feedback equalization circuit of claim 14, wherein the floating taps comprises a group of floating taps at consecutive taps with a lowest tap being set by the floating tap position setting.

16. The decision feedback equalization circuit of claim 14 further comprising:

a control circuit for determining a performance of the decision feedback equalization for different floating tap position settings and selecting a specific floating tap position setting based on said performance.

* * * * *